United States Patent
Anderson

(10) Patent No.: US 10,549,327 B2
(45) Date of Patent: Feb. 4, 2020

(54) METHOD AND SYSTEM FOR TREATING MUNICIPAL SOLID WASTE

(71) Applicant: GLOBAL ORGANICS ENERGY, Edina, MN (US)

(72) Inventor: Joseph Anderson, Reno, NV (US)

(73) Assignee: GLOBAL ORGANICS ENERGY, Edina, MN (US)

(*) Notice: Subject to any disclaimer, the term of this patent is extended or adjusted under 35 U.S.C. 154(b) by 650 days.

(21) Appl. No.: 14/376,341

(22) PCT Filed: Feb. 1, 2013

(86) PCT No.: PCT/US2013/024272
§ 371 (c)(1),
(2) Date: Aug. 1, 2014

(87) PCT Pub. No.: WO2013/116597
PCT Pub. Date: Aug. 8, 2013

(65) Prior Publication Data
US 2015/0041574 A1    Feb. 12, 2015

Related U.S. Application Data

(60) Provisional application No. 61/593,526, filed on Feb. 1, 2012.

(51) Int. Cl.
*B02C 19/00* (2006.01)
*B09B 3/00* (2006.01)
*B02C 19/18* (2006.01)
*B02C 23/24* (2006.01)

(52) U.S. Cl.
CPC .......... *B09B 3/0091* (2013.01); *B02C 19/186* (2013.01); *B02C 23/24* (2013.01)

(58) Field of Classification Search
CPC ...... B02C 19/186; B02C 23/24; B09B 3/0091
(Continued)

(56) References Cited

U.S. PATENT DOCUMENTS 5,148,997 A * 9/1992 Gotoh ................. B02C 17/10
                                                    241/228
5,190,226 A * 3/1993 Holloway ............. B01J 19/28
                                                    209/930

(Continued)

FOREIGN PATENT DOCUMENTS

CN    201646239 U    11/2010
GB    2 421 688 A    7/2006

(Continued)

OTHER PUBLICATIONS

Office Action dated Mar. 21, 2016 by the European Patent Office in corresponding European Application No. 13 743 915.4 (4 pages).
Extended European Search Report dated Jun. 22, 2015, issued by the European Patent Office in the corresponding European Application No. 13743915.4. (7 pages).

(Continued)

*Primary Examiner* — Faye Francis
(74) *Attorney, Agent, or Firm* — Buchanan Ingersoll & Rooney PC

(57) ABSTRACT

A method for treating process material using a plurality of autoclaves, wherein each of the plurality of autoclaves cycles through the following steps: introducing a steam from one or more of the plurality of autoclaves to the interior of the vessel; increasing the temperature within the vessel by adding heat to the interior of the vessel using an indirect heat source; reducing the temperature and pressure within the vessel by venting a portion of the steam within the interior of the vessel to another one of the plurality vessels; increasing the temperature within the vessel by continuing to add heat to the interior of the vessel using the indirect heat source; reducing a moisture content of the process material in the interior of vessel to a predetermined value by conveying the steam to another one of the plurality of vessels.

30 Claims, 18 Drawing Sheets

(58) Field of Classification Search
USPC .................................................... 241/65, 23
See application file for complete search history.

(56) References Cited

U.S. PATENT DOCUMENTS

| | | | |
|---|---|---|---|
| 5,366,673 | A | 11/1994 | Wosnitza et al. |
| 5,540,391 | A * | 7/1996 | Anderson ............... B01J 19/28 241/17 |
| 5,655,718 | A | 8/1997 | Anderson |
| 6,315,146 | B1 | 11/2001 | Johnsen |
| 2008/0217444 | A1* | 9/2008 | Michalek ............... A61L 11/00 241/1 |

FOREIGN PATENT DOCUMENTS

| | | |
|---|---|---|
| GB | 2 445 465 A | 7/2008 |
| GB | 2472599 A | 2/2011 |
| RU | 2 084 194 C1 | 7/1997 |

OTHER PUBLICATIONS

International Search Report (PCT/ISA/210) dated May 7, 2013, by the Russian Patent Office as the International Searching Authority for International Application No. PCT/US2013/024272.
Written Opinion (PCT/ISA/237) dated May 7, 2013, by the Russian Patent Office as the International Searching Authority for International Application No. PCT/US2013/024272.
Office Action dated Feb. 2, 2018 by the European Patent Office in corresponding European Application No. 13 743 915.4.
First Examination Report dated Sep. 21, 2018 in corresponding Australian Patent Application No. 2017279614.

* cited by examiner

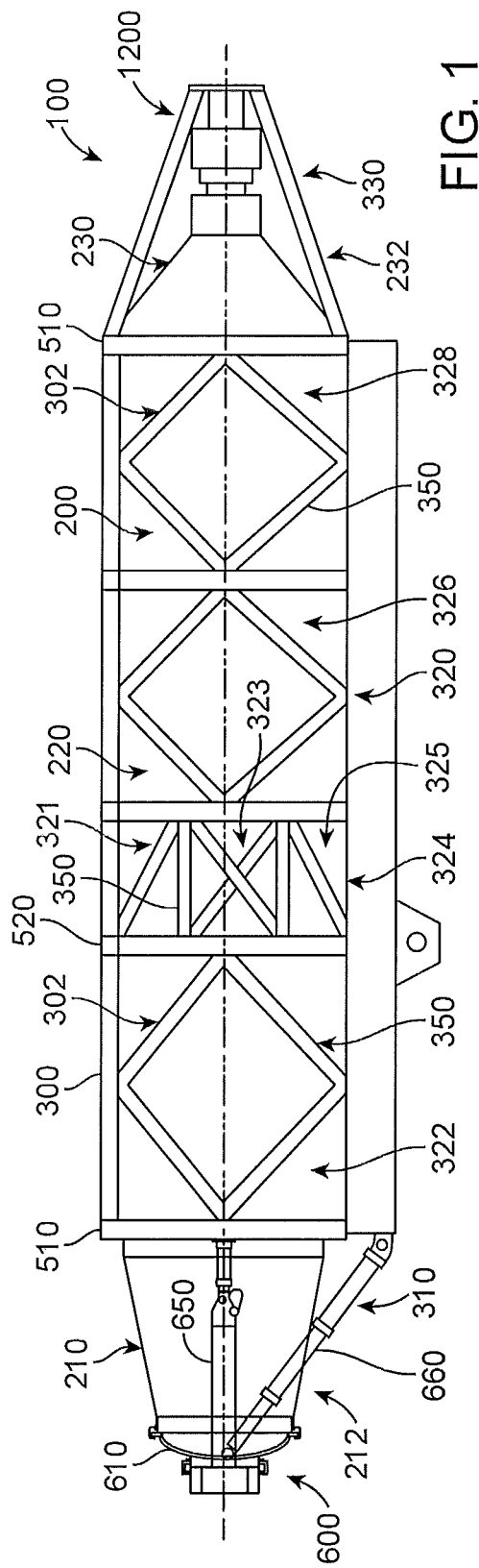
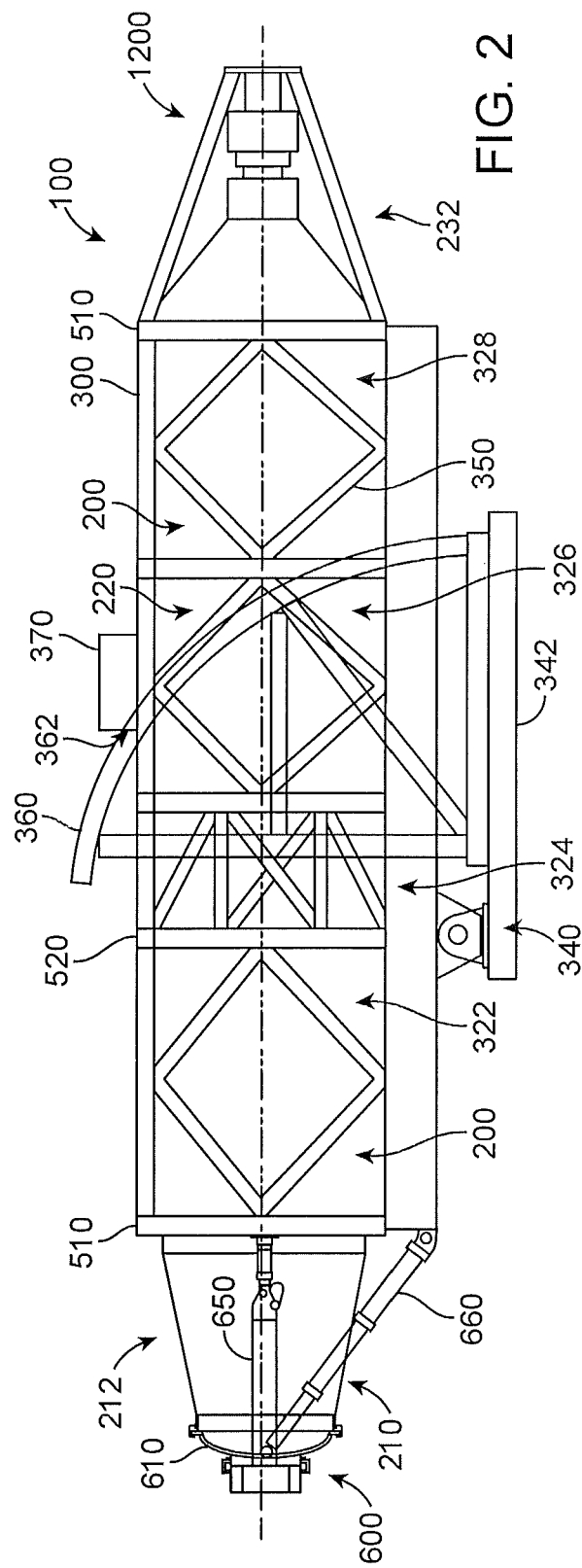

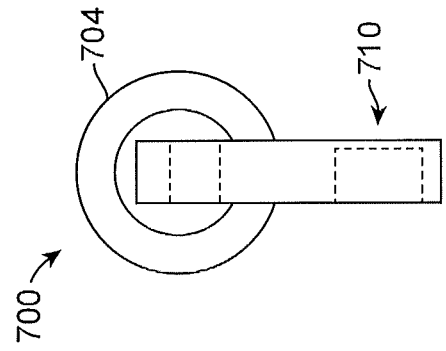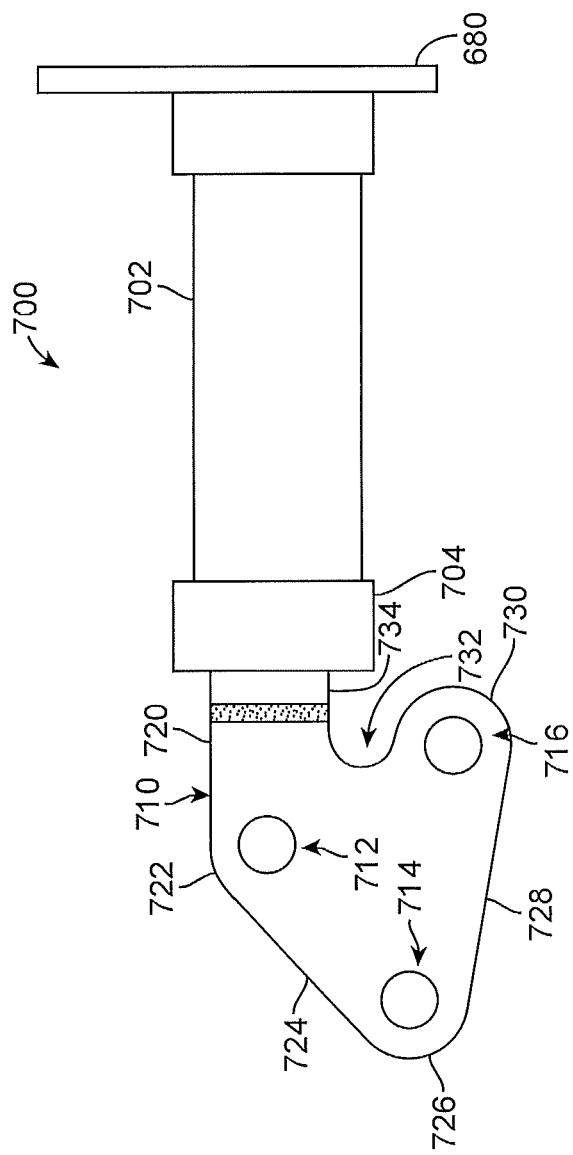

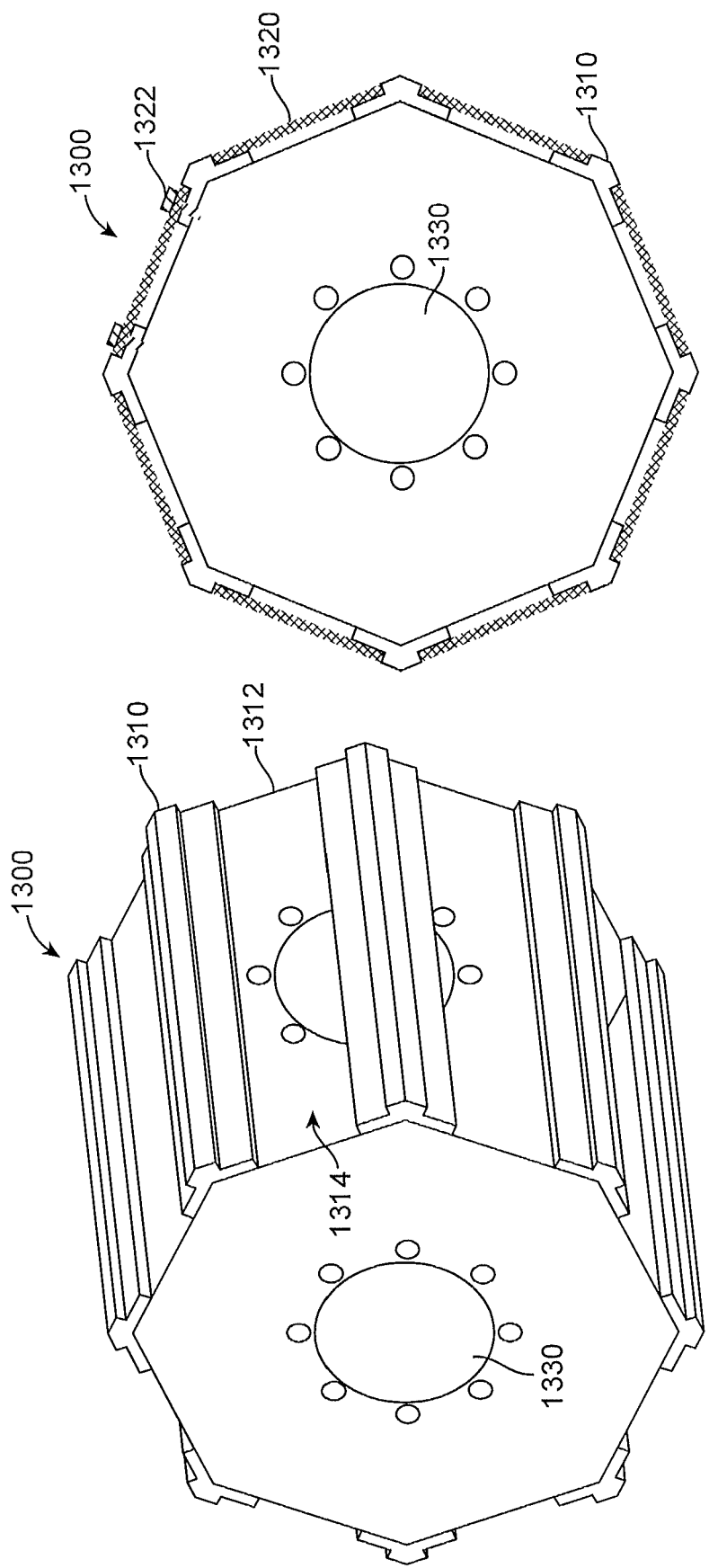

METHOD AND SYSTEM FOR TREATING MUNICIPAL SOLID WASTE

FIELD OF THE INVENTION

The present invention relates generally to the treatment of process materials, and more particularly to an apparatus, system and method for treating municipal solid waste (MSW) using heat and pressure.

BACKGROUND OF THE INVENTION

Landfills are commonly used to dispose of waste materials of many different types. These waste materials can include paper products, food scraps, yard waste, metal, glass, plastic and a host of other materials. In an attempt to reduce the amount of waste material that is deposited in landfills, source separating efforts in the form of recycling programs have been instituted. To the extent they are used, such recycling programs help reduce landfill dependence. However, it has been found that such recycling programs only result in the removal of a relatively small percentage of the total waste material. In the case of at least some material, such as paper products and others, the relatively small recovery rate can be attributed at least in part to the fact that a large percentage of the products are food-contaminated and thus quite difficult to separate and recycle.

Various proposals have been made in the past to treat waste material prior to its introduction into a landfill in an attempt to recover portions of the material and thereby reduce landfill dependence. However, generally speaking, those proposals have not been well received, as they are not particularly suited for efficiently and effectively treating different types of waste materials such as those commonly found in municipal solid waste (MSW). Municipal solid waste is generally the most complex and mixed material occurring in waste streams. Thus, systems for effectively and efficiently treating municipal solid waste must be capable of treating and breaking down a wide range of different materials.

In addition to being not well suited for handling a wide range of materials, past proposals for treating waste material also suffer from other disadvantages and drawbacks. For example, some proposals require a supply of heated boiler quality water for heating the treated material. However, the need for water of that quality significantly increases the cost and complexity of the treating facility. Moreover, the use of boiler quality water is not needed since the water immediately becomes contaminated once it is introduced into the treated material.

In addition, in situations in which the material being treated has been heated and saturated with hot water for purposes of breaking down the waste material, steam is employed in an attempt to dry the material to a specified degree. However, as might be expected, steam is not very well suited as a drying mechanism since it tends to introduce additional moisture into the material. Thus, past proposals have not been well suited to allowing the material to be dried to any desired degree. Moreover, little effort has been made to recover the heat that is generated during the treatment process.

Accordingly, it would be desirable to have an automated apparatus and system, which is designed to treat municipal solid waste (MSW), and more particularly an automated system, which is designed to treat municipal solid waste (MSW) with wastewater from waste activated sludge (WAS) treatment facility.

Objects and Summary of the Invention

The present invention provides an apparatus, system and method for treating process material that are not susceptible to the same disadvantages and drawbacks as mentioned above. The present invention is well suited for effectively and efficiently treating materials of many different types, including municipal solid waste and oil contaminated soils. Organic and inorganic materials can be conditioned by varying treatment parameters, thereby facilitating sorting by size and density separation into their primary components.

The present invention allows separation of food waste, ink, oil, grease and other related products from a host of base materials such as metal, glass and paper. Food products, for example, can be solubilized and then extracted from the waste stream. Additionally, a relatively clean, high quality form of cellulose can be recovered from the waste stream. It is also possible to obtain clean metal products (i.e., cans) which are much more readily acceptable as feedstock for various industries. Likewise, paper products can be treated to produce high quality recyclable material that can be separated for use in various industries. For example, through use of a fractionator, larger fibrous material can be divided out from the shorter fibrous material, with the former having possible use in the paper industry as recycled paper and the latter being used possibly in the electrical industry.

The present invention is also advantageous, as it does not require boiler quality water to effectively treat the material. Indeed, through use of the present invention, it is possible to use relatively low quality water, which is then extracted at the end of the treatment process as a relatively high quality water product. For example, waste activated sludge (WAS) or low quality water source can be used. It is possible to implement the present invention such that energy needs can be completely or at least partially supplied from the process fuels generated. For example, it is possible to use low pressure steam that is readily available from the cogeneration features of most electrical generating facilities, which use steam or gas and seek low temperature application for their waste heat.

The present invention is also well suited for conserving and optimizing heat and water usage through use of a system of two or more vessels, and more preferably three or four vessels that are connected to one another in a way that allows steam vented from one vessel during a drying phase of operation to be conveyed (or vented) to another vessel, which is in a phase of operation requiring the addition of heat and moisture. In addition, the present invention allows the waste material being treated to be dried to a desired degree.

In accordance with one aspect of the present invention, a method for treating process material using a plurality of autoclaves, each of the plurality of autoclaves comprising a hollow vessel having a longitudinal axis and an interior for receiving process material to be treated, wherein each of the plurality of autoclaves cycles through the following steps: introducing a steam from one or more of the plurality of autoclaves to the interior of the vessel; increasing the temperature within the vessel by adding heat to the interior of the vessel using an indirect heat source; reducing the temperature and pressure within the vessel by venting a portion of the steam within the interior of the vessel to another one of the plurality vessels; increasing the temperature within the vessel by continuing to add heat to the interior of the vessel using the indirect heat source; and reducing a moisture content of the process material in the interior of vessel to a predetermined value by conveying the steam to another one of the plurality of vessels.

In accordance with another aspect of the invention, a system for treating a process material, the system comprises: a plurality of autoclaves, each of the autoclaves comprising a hollow vessel having a longitudinal axis and an interior for receiving process material to be treated, said vessel having an opening communicating with the interior of the vessel for allowing introduction of process material to be treated into the interior of the vessel, and wherein each of the plurality of autoclaves cycles through the following steps: receiving a process material into the interior of the vessel; introducing a steam from one or more of the plurality of autoclaves to the interior of the vessel; increasing the temperature within the vessel by adding heat to the interior of the vessel using an indirect heat source; reducing the temperature and pressure within the vessel by venting a portion of the steam within the interior of the vessel to another one of the plurality vessels; increasing the temperature within the vessel by continuing to add heat to the interior of the vessel using the indirect heat source; reducing a moisture content of the process material in the interior of vessel to a predetermined value by conveying the steam to another one of the plurality of vessels; and removing the process material in the vessel after the moisture content of the process material has reached the predetermined value.

In accordance with a further exemplary embodiment, an apparatus for treating a process material, the apparatus comprises: a hollow vessel having a longitudinal axis and an interior for receiving the process material, said vessel having an opening on one end thereof for communicating with the interior of the vessel to allow introduction of the process material into the interior of the vessel, and a rotary coupling on an opposite end thereof, which introduces a steam into the interior of the vessel; and a door assembly having a double locking ring system, which includes a main annular locking ring, which secures a door to a front portion of the vessel, and a locator annular locking ring, which provides a means for removing and attaching the door to the front portion of the vessel.

In accordance with another exemplary embodiment, a double locking door assembly for a hollow vessel having a longitudinal axis and an interior for receiving a process material, the double locking door assembly comprises: a door; a main annular locking ring, which secures the door to a front portion of the vessel, and a locator annular locking ring, which removes and attaches the door to the front portion of the vessel.

BRIEF DESCRIPTION OF THE DRAWING FIGURES

The foregoing features, in addition to others, will become more apparent from the detected description below considered in conjunction with the drawing figures in which like elements bear like reference numerals and wherein:

FIG. 1 is a side view of an apparatus in accordance with an exemplary embodiment.

FIG. 2 is another side view of the apparatus as shown in FIG. 1 in accordance with a further embodiment.

FIG. 8A is a side view of the upper door lift frame ram hinge for servomotor piston arrangement in accordance with an exemplary embodiment.

FIG. 8B is an end view of an upper door lift frame ram hinge for a servomotor piston arrangement in accordance with another exemplary embodiment.

FIG. 13 is a perspective view of a rotary coupling in accordance with an exemplary embodiment.

FIG. 14 is an end view of the rotary coupling of FIG. 13 with screen or screen-like elements in accordance with an exemplary embodiment.

DETAILED DESCRIPTION OF THE PREFERRED EMBODIMENT

Figure 3:
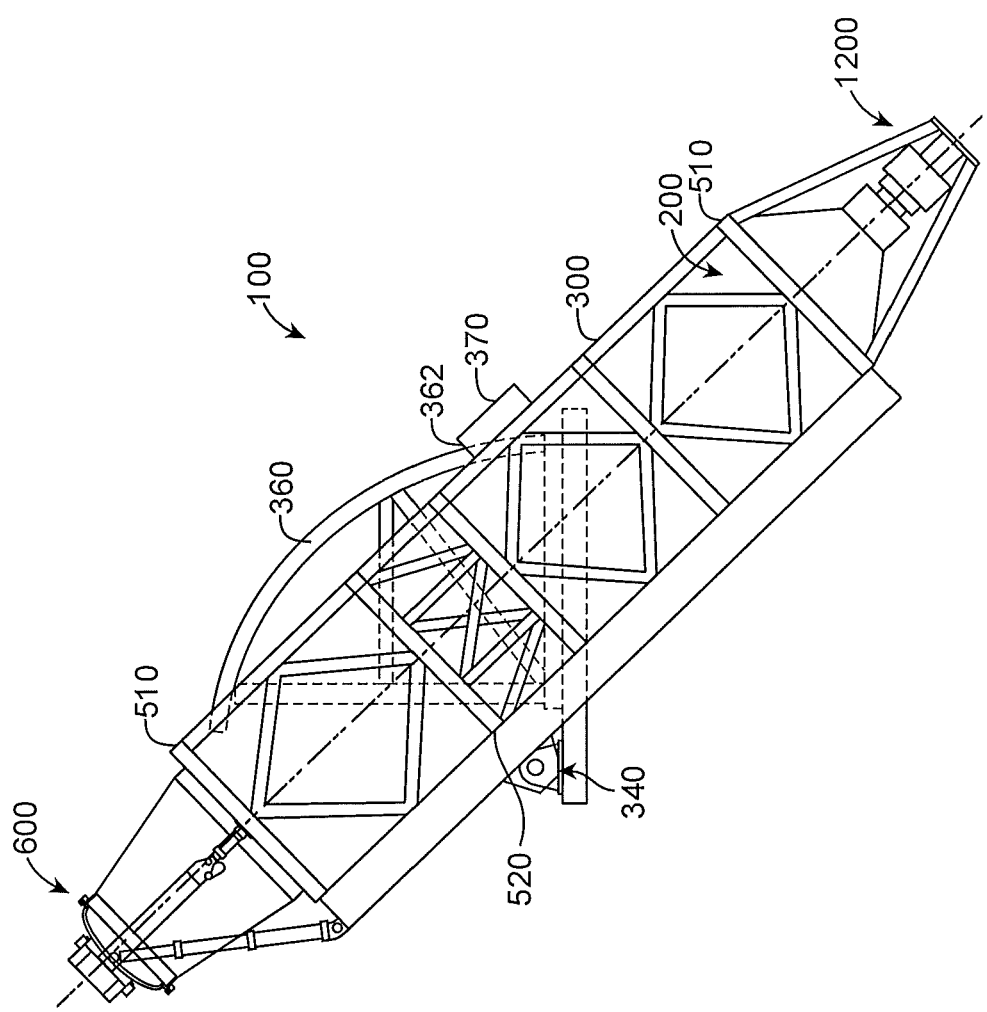
FIG. 3 is a side view of the apparatus as shown in FIG. 1 in loading position in accordance with an exemplary embodiment.
Figure 4:
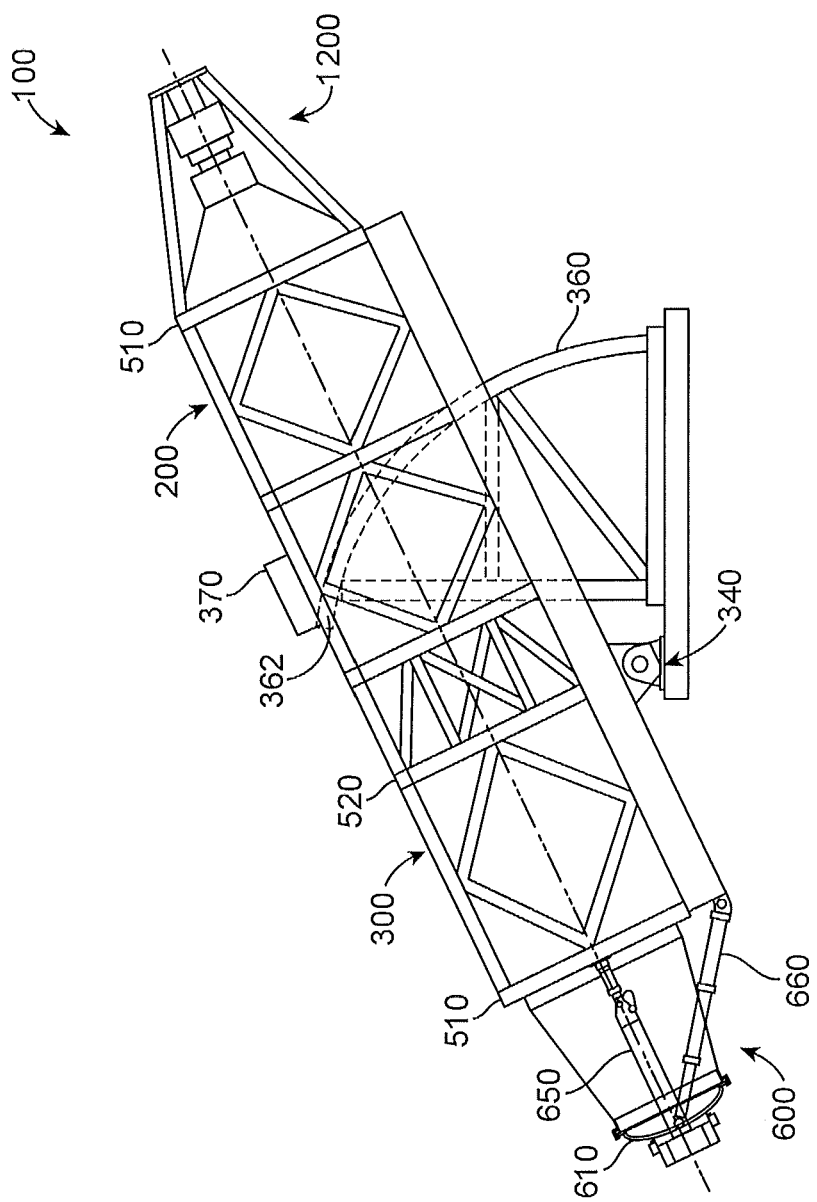
FIG. 4 is a side view of the apparatus as shown in FIG. 1 in a venting and steam transfer position in accordance with another exemplary embodiment.

In accordance with an exemplary embodiment, the apparatus, method and system as described herein can be used for waste processing and product recovery. For example, the apparatus, method and system as described herein can accommodate municipal waste as a separate stream covering municipal solid waste (MSW) and waste activated sludge (WAS) or low quality water source, which are jointly created continuously by all municipal communities. Municipal solid waste (MSW) typically includes residential, both single family and multiple-tenant dwellings, food including fast food and restaurant facilities, and office buildings. These different types of MSW are normally combined at landfills the final repository as the culmination of a well-organized and regulated industry developed over many years for collection and recycling covering resource recovery requirements. The need for altering this routine is primarily being insisted upon to counter the perception that landfill gas emissions are one of the main contributors to climate change and should be significantly reduced.

In addition to disposing of a very active waste, the processes described herein can greatly enhance the adverse production of greenhouse gases. For example, the processes can significantly increase the volume of biogas produced coupled with providing a source of low quality water needed as a wetting agent for the autoclave contents. This low quality water supplied with the waste activated sludge (WAS) is recycled in the extended process being reused many times in the rinsing tanks. In accordance with an exemplary embodiment, an anaerobic digester as described in detail in U.S. Pat. No. 6,730,223 B1, the disclosure of which is incorporated herein by reference, acts as a rinse water treatment system allowing multiple reuses of this water. Where it is possible to combine the waste activated sludge (WAS) from wastewater treatment plants with the municipal solid waste (MSW) transfer stations the resulting energy and other commodities produced provide an even more attractive investment return. In accordance with an exemplary embodiment, a connector in the form of a small pipeline connection can be used to produce an efficient balance. In accordance with an exemplary embodiment, the introduction of waste activated sludge (WAS) coupled with a wastewater treatment and gas technology, such as those developed by Biothane® can produce a cellulose product, which can be provided and/or sold to a number of markets including the paper industry, biofuels and bioproducts. In addition, the use of biofuels and bioparts can be optimized to address the dependency on petroleum products, which continues despite the development of renewable resources.

In addition, in accordance with an exemplary embodiment, the autoclave pressure vessel (i.e., autoclave or vessel) is capable of operating in a vacuum mode that can act also act as a condenser when receiving steam (e.g., vapor form of a heated liquid). In accordance with an exemplary embodiment, the autoclave uses the wetted material as it is tumbled to accelerate the change of state from steam to water occurring with this mode of heat exchange. A similar condition occurs when the autoclave is called upon later in the cycle to act as a steam generator as it moves into the cool down mode again taking advantage of the tumbling action to transfer heat from the autoclave through the change of state, this time water to steam. In accordance with an exemplary embodiment, because these two actions are between two autoclaves with identical heat loads the system interaction is time efficient related to the impact on cycle time providing equal and opposite transfers of energy.

In accordance with another exemplary embodiment, a preferred grouping of four autoclaves within a single plant with each vessel on a staggered two-hour cycle, which allows three of the four autoclaves to be continuously pressurized. The use of a grouping of four autoclaves allows the system to maximize heat recovery and avoid plastics from inadvertently sticking to the indirect heat surfaces. In addition, the energy transfer between the vessels increases energy reuse and improves product quality.

In accordance with a further exemplary embodiment, in a system of two or more autoclaves, the behavior between at least two autoclaves provide for a heat transfer operation wherein heat in the form of steam (e.g., a heated liquid) is introduced from an adjacent autoclave during flashing of steam and/or during a cooling phase (i.e., cool-down phase) by using an interconnecting system of piping and valves. The system also preferably includes a gasifier to thermochemically reform the residual fines and other combustibles into a synthetic gas that would further contribute to the significant biogas already obtained further increasing the landfill diversion rate while adding to the electrical generation capacity.

The apparatus (or autoclave) 100 according to a preferred embodiment of the present invention includes a vessel 200 that is fabricated of a stiff and rigid material (e.g., steel). The vessel 200 is mounted in a frame structure 300 and includes a generally cylindrically-shaped intermediate section 220 that is positioned between a front cone portion 210 located at a forward end 212 of the vessel 200 and a rearward cone portion 230 located at a rearward end 232 of the vessel 200. The frame structure 300 includes a forward supporting section 310 and a rearward supporting section 330, which are connected together by longitudinal supporting members 320 that extend between corresponding corners of the forward and rearward supporting sections 310, 330. As shown in FIGS. 1-4, the frame structure 300 is comprised of bracing members, which form a plurality of space frames 302 and rigid frames 304. The plurality of space frames 302 are truss-like, interlocking struts, which are in geometric patterns. The plurality of rigid frames 304 are comprised of a plurality of straight or curved members interconnected by mostly rigid connections, which resist movements induced at the joints of members. The plurality of rigid frames 304 are configured to handle bending moment, shear and axial loads within the frame structure 300. The combination of space frames 302 and rigid frames 304 within the frame structure 300 provides a frame structure 300, which can support the loads generated by the weight and movement of the vessel 200 during the various stages of loading, cooking, and unloading of the vessel 200.

The cylindrical intermediate section 220 of the vessel 200 includes several additional supporting sections, which are connected to one another by bracing members 350 as seen in FIGS. 1-4. The additional supporting sections are also generally rectangular in shape (as seen from either end of the apparatus) and surround the intermediate section 220 of the vessel 200. Diagonally extending bracing members (or space frame member 302) are connected to the rearward supporting section 330 and serve to support the rearward end 232 of the vessel 200. Various other diagonally arranged bracing members 350 can also be provided to stiffen and strengthen the frame structure 300 and help support the significant loads imposed by the vessel 200.

As seen in FIGS. 1-4, the frame structure 300 is pivotally mounted on a pair of trunnion supports 340 so that the frame structure 300 and the vessel 200 can pivot about a pivot axis. The pivot axis is arranged transverse to the longitudinal axis of the vessel 200. The pair of trunnion supports 340 is attached or fixed within a concrete flooring or housing 342. The pair of trunnion supports 340 provides a swivel joint to the apparatus 100, which allows for the vessel 200 to move or pivot as described herein.

In accordance with an exemplary embodiment, the forward and rearward supporting sections 310, 330 have a generally rectangular cross section (as seen from either end of the apparatus 100) and surround the opposite ends of the intermediate section 220 of the vessel 200. As shown in FIGS. 1-4, the frame support 300 includes the forward and rearward support sections 310, 330, and an intermediate section 320. The intermediate section 320 comprises a first intermediate section 322, a second intermediate section 324, a third intermediate section 326 and a fourth intermediate section 328. The first, third and forth intermediate sections 322, 326, 328 include a truss like structure in the form of a space frame 304 having a diamond shape thereto. The second intermediate 324 includes an upper section 321, a mid section 323, and a lower section 325. The upper section 321 includes a space frame in the form of a diagonal strut, which forms a truss having upper and lower triangular units. The mid-section 323 includes a pair of struts, which are configured in a diagonal or X-shaped configuration. The lower section 325 includes a space frame in the form of a diagonal strut, which forms a truss having upper and lower triangular units. The struts of the upper and the lower sections 321, 325 extend from an upper portion of the frame structure 300 downward to a vertical strut positioned towards the rearward end or portion 212 of the vessel 200. The second intermediate section 324 is adjacent to a pair of trunnion supports 340, which allows for the vessel 200 to move or pivot as described herein.

In accordance with an exemplary embodiment, the vessel 200 is movable between a first position (shown in dotted line configuration in FIGS. 1 and 2) in which the forward end 212 of the vessel is directed upwardly at an angle of approximately 45 degrees (shown in dotted line configuration in FIG. 3) with respect to the horizontal so that the forward end 212 of the vessel 200 is positioned above the solid line horizontal position depicted in FIG. 1, and a second position (also shown in dotted line configuration in FIG. 4) in which the forward end 212 of the vessel 200 is directed downwardly at an angle of approximately 25 degrees with respect to the horizontal so that the forward end 212 of the vessel 200 is positioned below the solid line (i.e., horizontal position) shown in FIGS. 1 and 2.

In accordance with an exemplary embodiment, an arcuate rack 360 is mounted on a supporting element for interacting with a pinion 362. The pinion 362 is driven by a motor 370, which is secured to the frame structure 300. Thus, during operation of the motor, the pinion 362 moves along the rack 360 to cause the frame structure 300 and the vessel 200 to pivot about the pivot axis. A stop is provided on the rack to limit the pivoting movement of the vessel 200 in the clockwise direction while another stop is positioned on the rack to limit pivoting movement of the vessel 200 in the counterclockwise direction. The pinion 362 and motor 370 in accordance with an exemplary embodiment are located on an upper portion of the frame structure 300, which provides for articulation of the vessel during loading and processing of the process material. Alternatively, the pinion 362 and motor 370 can be located on a lower portion of the frame structure 300.

As shown in FIGS. 1-4, the pair of trunnion supports 340 are located at forward portion or front end 212 of the vessel 200. The arcuate rack 360 extends from a rearward portion or rearward end 232 of the vessel 200 on a lower portion of the frame structure 300 and arcs towards the front portion 210 or front end 212 of the vessel 200. For example, for a vessel 200 having a length of 60 feet and a diameter of 12 feet, the vessel 200 can weigh in excess of 200 tons (40,000 lbs). As described above, the pinion 362 and motor 370 preferably moves the vessel 200 from a first position in which the forward end 212 of the vessel 200 is directed upwardly at an angle of approximately 45 degrees with respect to the horizontal to a second position in which the forward end 212 of the vessel 200 is directed downwardly at an angle of approximately 25 degrees with respect to the horizontal. The respective angles of the forward end 212 of the vessel 200 as described above are preferred and may vary depending on the desired operating conditions of the vessel 200 without departing from the present invention.

During the initial phase of operation of the vessel 200, the waste material or process material to be treated preferably in the form of municipal solid waste (MSW) is introduced into the vessel 200 along with a wetting agent (e.g., water and/or waste activated sludge (WAS)). The wetting agent in accordance with an exemplary embodiment can be a waste activated sludge (WAS). The moisture content of the waste material is further increased through the introduction of a heated liquid in the form of steam, which is preferably in a saturated steam condition. The steam also increases the temperature within the vessel 200 as well as the temperature of the waste material (e.g., MSW)) itself. Through the use of a heated liquid (e.g., steam), which is conveyed through the interior of the vessel 200, desired levels for the temperature and pressure within the vessel 200 are achieved. Throughout much of the vessel operation, the vessel 200 is preferably rotated to break down the paper type products and facilitate cleaning of other materials (e.g., glass, metal objects, etc.). In accordance with an exemplary embodiment, the vessel 200 rotates at approximately one (1) revolution per minute (rpm) to approximately 12 revolutions per minutes (rpm), and more preferably approximately 4 rpm to approximately 8 rpm.

The vessel 200 is then vented (i.e., steam is released) to begin the cooling and depressurization of the vessel 200 while at the same time reducing the moisture content of the material within the vessel 200. The steam within the vessel 200 is preferably released (or flashed) at least once, and can be released or flashed more than once without departing from the present invention. The one or more flashes of steam from within the vessel 200 can be used control the temperature within the vessel 200. For example, if the operator of the autoclave 100 wishes to control the temperature within a vessel 200 and/or alternatively an adjacent vessel 200, each of the vessels 200 can release and/or flash steam to another vessel 200. In addition, the release or flashing of steam reduces the moisture content within the vessel 200.

In accordance with an exemplary embodiment, one or more eductors 1750 (FIG. 17) can be used to reduce the pressure within the vessel 200, which in turn lowers the boiling point of the heated liquid (or steam). The one or more eductors 1750 can produce a negative explosion (or steam explosion), which assists with the drying of the process material within the vessel. In addition, by lowering the boiling point of the heated liquid (or steam) within the vessel 200, the one or more eductors 1750 provide a means to reduce the moisture content within the vessel 200. The indirect heat source (e.g., hot oil) continues to be conveyed through the vessel 200, and is used to dry the material to a desired degree. Once the moisture content and the temperature of the process material within the vessel 200 has been reduced to desired levels, the process material (or biomass) is emptied from the vessel 200, and the vessel 200 is readied to begin another treatment cycle.

Figure 5A:
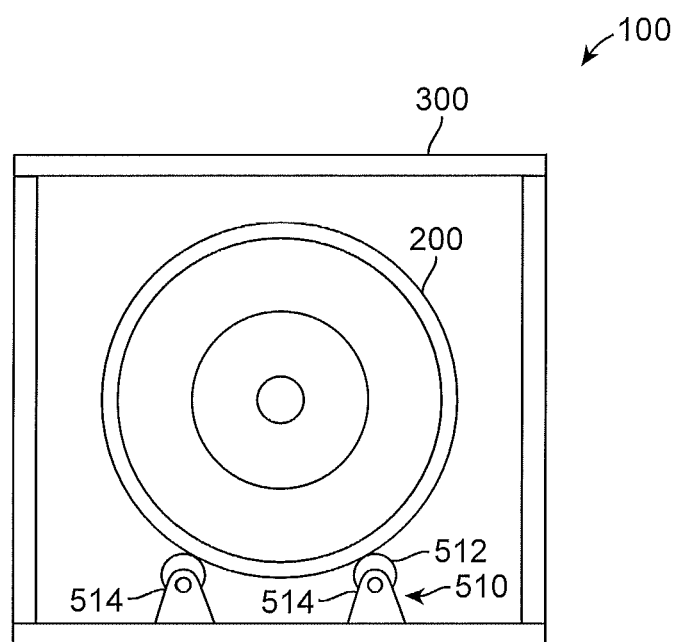
FIG. 5A is an end view of the apparatus showing the frame structure showing a pair of vessel supports in accordance with an exemplary embodiment.

FIG. 5A is an end view of the apparatus showing the frame structure 300 showing a pair of vessel supports 510. As shown in FIG. 5A, the vessel 200 is preferably supported on the frame structure 300 by way of a first pair of vessel supports (not shown) located towards the forward end of the vessel 200 and a second pair of vessel supports 510, located near the rearward end of the vessel 200. The vessel supports support 510 the vertical loads imparted by the vessel 200 and transmit those vertical loads to the frame structure 300. Each of the vessel supports 510 is comprised of a freely rotatable flat wheel 512 that is mounted on a shaft. During operation, the vessel 200 experiences thermal expansion and contraction in a direction along the longitudinal axis of the vessel (i.e., the vessel expands in length). The use of the support wheels 510, which have a flat outer circumferential surface is advantageous since the support wheels allow that thermal expansion and contraction to occur in an unrestrained manner.

Each of the vessel supports 510 is also provided with a load sensor 514 for measuring the live load distribution within the vessel 200. The load sensor 514 is preferably in the form of strain gauge instrumentation. In accordance with an exemplary embodiment, input from the sensors 514 is used to effect an approximate equal distribution of the material located in the vessel during the treatment operation. For example, input from the sensors 514 can be used to control the angle of inclination of the vessel 200 through suitable operation of the motor 370. Thus, if the sensor 514 associated with the front vessel support detects a load significantly greater than the sensor 514 associated with the rearward vessel support, the motor 370 is appropriately operated to raise the vessel 200 and thereby cause the material in the vessel 200 to move towards the rearward cone portion 230 of the vessel 200.

Figure 5B:
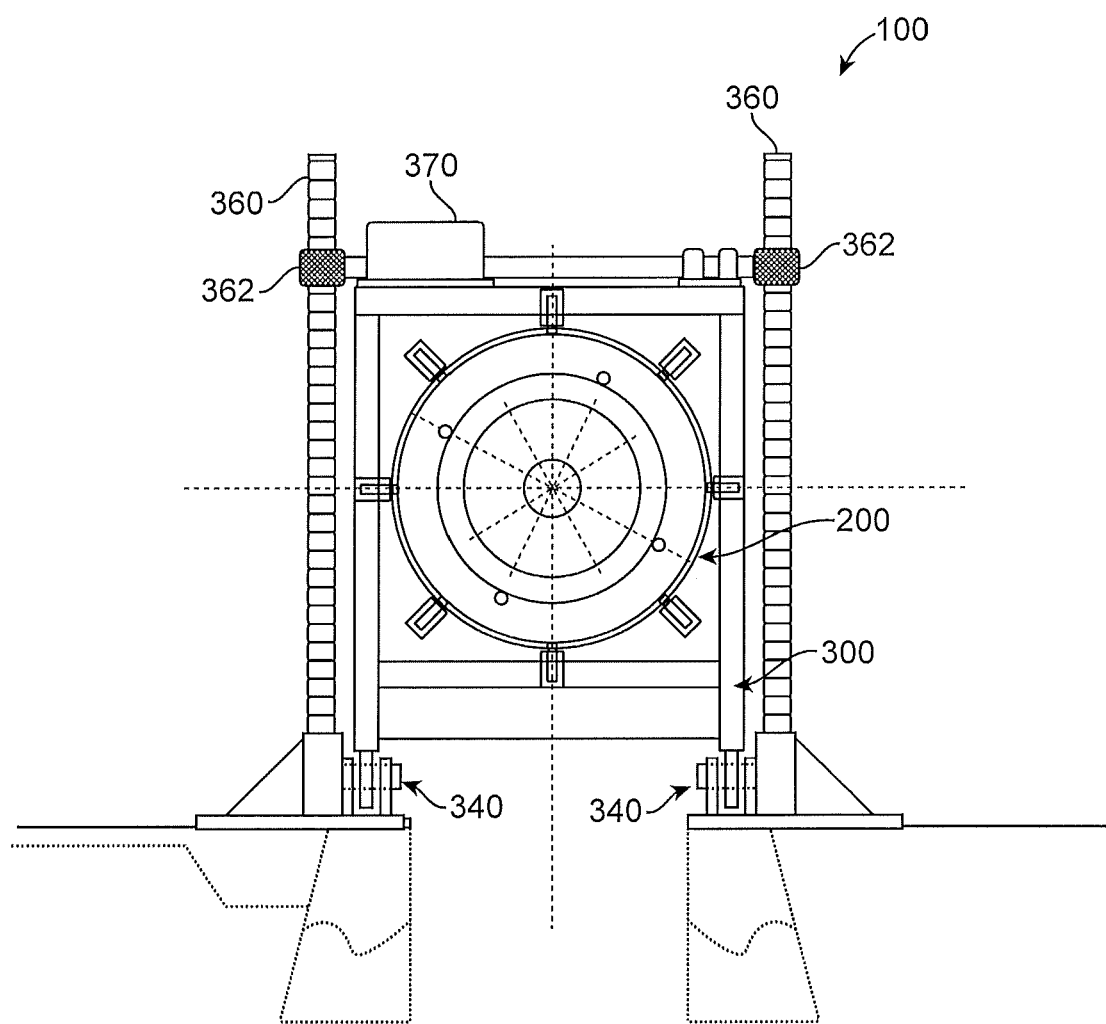
FIG. 5B is an end view of the apparatus showing the vessel supported on a pair of trunnion supports and having a plurality of longitudinal thrust bearings in accordance with an exemplary embodiment.

FIG. 5B is an end view of the apparatus 100 showing the vessel 200, which is supported on the pair of trunnion supports 340. The frame structure 300 is also provided with a plurality of longitudinal thrust bearings 520, which are located between the first and second pair of vessel supports 510. As seen in FIG. 5B, the apparatus includes eight longitudinal thrust bearings 520. The longitudinal thrust bearings 510 help prevent movement of the vessel 200 in a direction along the longitudinal axis of the vessel. In addition, the longitudinal thrust beatings 520 support longitudinal loading along the longitudinal axis of the vessel 200 and transfer such loading to the frame structure 300 when the vessel 200 is in a position other than the horizontal position.

Each of the longitudinal thrust bearings 520 preferably includes a roller 522 that is freely rotatable about an axis directed generally towards the longitudinal axis of the vessel 200. Each freely rotatable roller 522 is appropriately secured to a mounting bracket, which is attached to one of the mounts or the supporting section. An annular guide extends around the entire outer peripheral surface of the vessel 200 and is provided with an annular groove that receives the respective rollers. In that way, the vessel 200 is free to rotate-about its longitudinal axis, yet is prevented from substantially moving in the direction along the longitudinal axis of the vessel 200. The longitudinal thrust bearings 520 are also designed to accommodate expansion and contraction of the vessel 200 during operation.

The autoclave 100 also includes a drive means for rotating the vessel in opposite directions about the longitudinal axis to cause the vessel and the material contacting member to rotate the vessel 200 in order to assist in breaking down the process material. The rotation of the vessel 200 is about a 360-degree arc or circle (i.e., a complete revolution of the vessel 200). In accordance with an exemplary embodiment, the drive means is a rotary drive arrangement for the vessel 200 in the form of an arcuate rack and pinion system (not shown), which is positioned around an outer portion of the vessel 200. The arcuate rack and pinion system is preferably located along the longitudinal midpoint of the vessel 200 to avoid imparting eccentric movement to the vessel 200 during operation of the rotary drive arrangement. Additionally, the intermediate section 220 provides structural support for the rotary drive arrangement.

In accordance with an exemplary embodiment, the arcuate rack and pinion system preferably includes a series of limit switches for slowing the rotation of the vessel 200 in steps when the direction of rotation of the vessel 200 is changed or when the rotation of the vessel 200 is stopped. In some instances, the arcuate rack and pinion system can be used to stop the rotation of the vessel 200 as needed. In addition, the drive means rotates the vessel 200 in both a clockwise and a counterclockwise direction depending on the phase or state of the treatment process. In addition, by varying the rotation of the vessel 200, the operator and/or automated program can maximize the use of the liquid transport conduits or helices 1510 (FIGS. 15 and 16) as described herein.

FIGS. 6-11 are illustrations of an exemplary door assembly (or split door assembly) 600, which includes a door 610, a pair of annular locking rings 620, 630 and a handling yoke and frame structure 640. In accordance with an exemplary embodiment, the municipal solid waste or waste material (MSW) or process material is fed into the interior of the vessel 200 through the door 610 positioned on the front cone portion 210 of the vessel 200. The door 610 is preferably large enough in diameter to accommodate a wide delivery conveyor belt or system. For example, in accordance with an exemplary embodiment, a twelve-foot diameter autoclave or vessel 200 preferably has an approximately eight-foot (8) diameter door 610. The door assembly 600 has a first or main annular locking ring 620, which is capable of complimentarily engaging a pair of flanges 622, 624 located on the door 610 and the vessel 200, respectively. The first or main annular locking ring 620 is preferably configured to handle the precision and accuracy needed for remote automatic handling of a door 610. In accordance with an exemplary embodiment, the first or main annular locking ring 620 is a hydraulic powered locking ring, which rotates approximately 15 to 60 degrees (½ to 2 notches) and more preferably approximately 30 degrees (or one notch) to compress the two flanges 622, 624 together forming an airtight seal between the interior of the vessel 200 and the door 610. The use of the hydraulic powered locking ring provides for an airtight seal without having to rotate the door 610, which can weigh in the range of 8 tons (or 16,000 lbs) for an eight-foot diameter door 610 used in an autoclave or apparatus 100 as described herein.

In accordance with an exemplary embodiment, an O-ring (not shown) is placed between the pair of flanges 622, 624, which creates the airtight seal between the pair of flanges 622, 624 upon tighten or closing of the first or main annular locking ring 620. The O-ring is preferably a loop of elastomeric or elastomeric-like material, which is designed to be compressed between the pair of flanges 622, 624 during closure of the door 610 creating an airtight seal. The O-ring preferably has a disc-shaped and/or elliptical cross-section. In accordance with an exemplary embodiment, the O-ring can be affixed to an outer surface of either flange 622, 624. In addition, if desired, the O-ring can be seated within a groove within either flange 622, 624.

Figure 6:
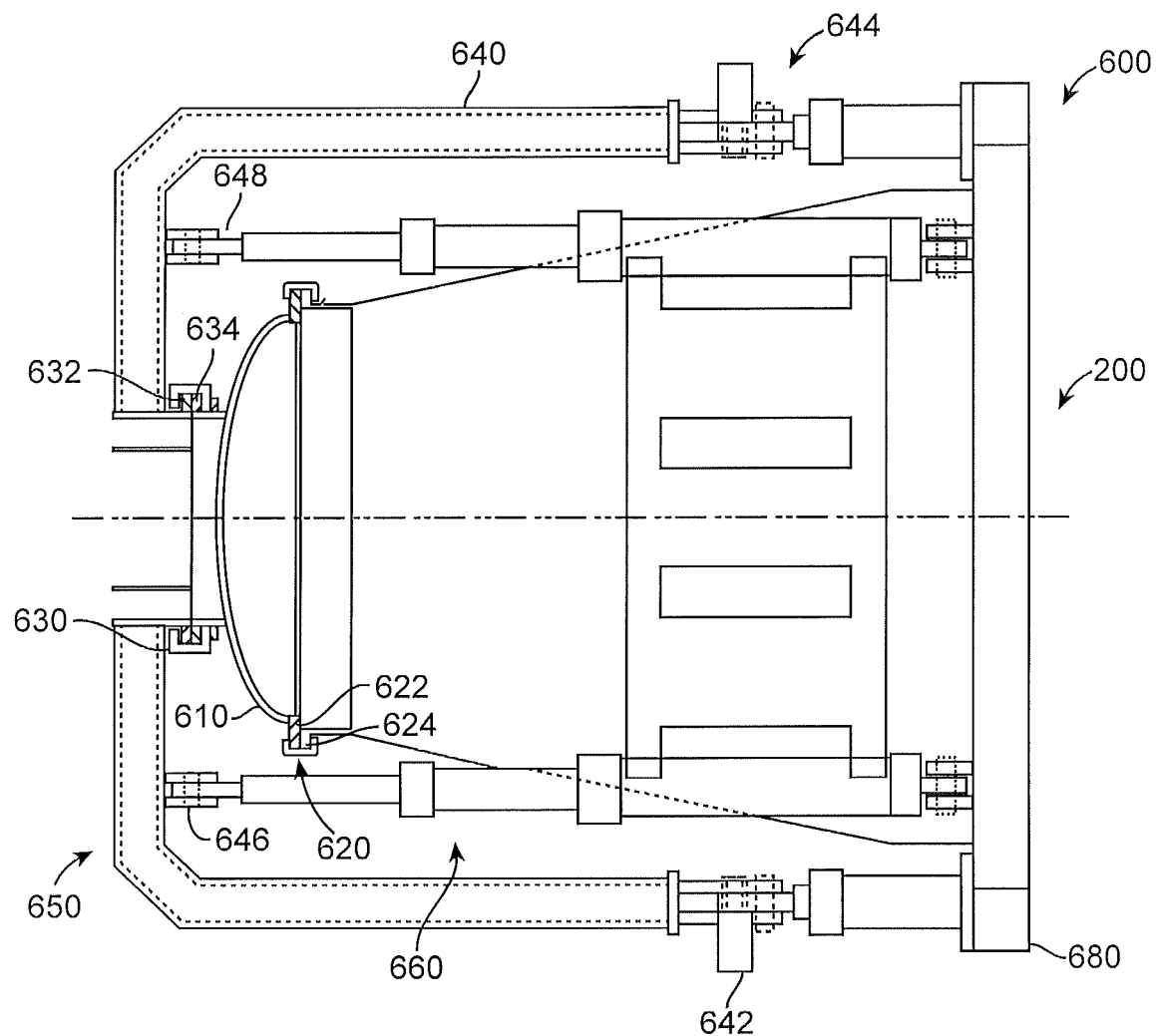
FIG. 6 is a plan view of the door assembly of the apparatus in accordance with an exemplary embodiment.

As shown in FIG. 6, the door assembly 600 preferably includes a double locking ring system, which includes the first or main annular locking ring 620, which secures the door 610 to the front cone portion 212 of the vessel 200, and a second or locator annular locking ring 630, which provides a means for removing and attaching the door 610 to the front cone portion 210 of the vessel 200. As shown, the second or locator annular locking ring 630 preferably includes a pair of flanges 632, 634, which are fixed to a handling yoke and frame structure 640 and the door 610, respectively. The second or locator annular locking ring 630 engages the pair of inner flanges to 632, 634 to remove the main annular locking ring 620 for loading and unloading of the vessel 200. For a twelve-foot diameter autoclave having an eight-foot diameter door 610, the second or locator annular locking ring 630 will preferably have a diameter of approximately four-feet. The handling yoke and frame structure 640 includes an upper door frame lift 650 (FIGS. 9 and 10) and a lower door frame lift 660 (FIG. 11), which articulate to provide added safety to the door assembly 600.

Figure 7A:
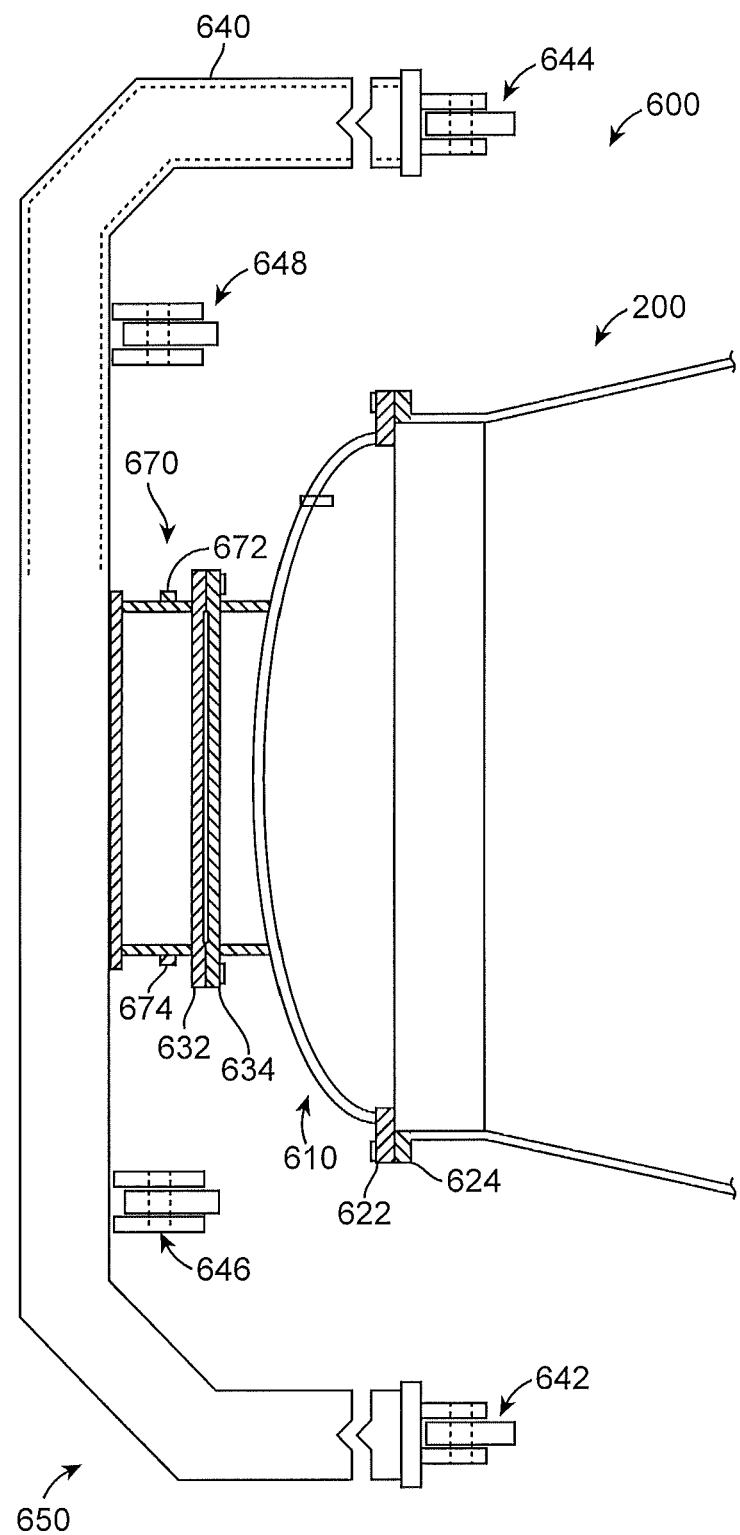
FIG. 7A is a side view of the door assembly of the apparatus as shown in FIG. 6 in accordance with a further exemplary embodiment.
Figure 7B:
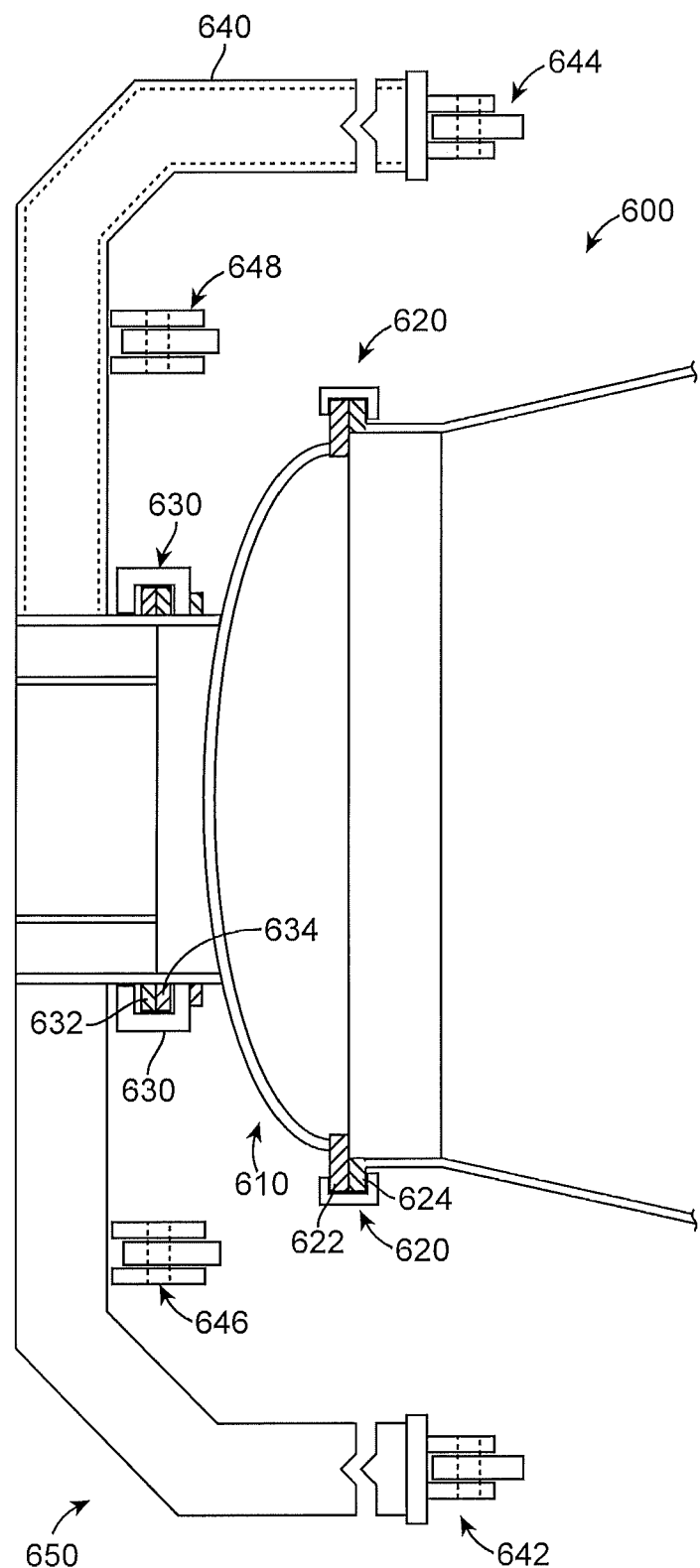
FIG. 7B is another side view of the door assembly of the apparatus as shown in FIG. 6 in accordance with an exemplary embodiment.

In accordance with an exemplary embodiment, as shown in FIGS. 7A and 7B, the door assembly 600 includes a two-position locator pin system 670, which can be initiated as part of the automated remote control system installed to handle the split door assembly 600. The locator pin assembly 670 assures that the door assembly 600 will remain securely fixed in either the open and/or closed position for the door 610, which allows the vessel 200 to rotate or articulate freely. As shown in FIG. 7A, the two-position locator pin system 670 includes a pair of locator pins 672, 674. The two-position locator pins 672, 674 are positioned adjacent to the pair of inner flanges 632, 634 and are configured to engage the second or locator annular locking ring 630 during removal of the main annular locking ring 620 for loading and unloading of the vessel 200. In accordance with an exemplary embodiment, the two-position locator pin system 670 assures that the door assembly 600 will remain securely fixed in either the open position (i.e., loading of the vessel) or the closed position (during heating and cooking).

In accordance with an exemplary embodiment, the door assembly 600 can be manually operated and/or alternatively, the apparatus 100 can include a door assembly 600 having a computerized automatic handling system and/or robotic system (not shown). The door assembly 600 is preferably designed for vessels 200 (or autoclaves) used in a large municipal solid waste plant, and where the door 610 is supported from the main structural frame 300 and can be stored under the front cone portion 212 of the vessel 200 when not locked in place on the front end 210 of the vessel 200 during loading of the vessel 200. The handling yoke and frame structure 640 is configured to be strong enough and stiff enough to support the door 610 as it is moved between a locked or closed position on the front of the vessel 200 during use, and an unlocked or open position when the door 610 is positioned or stowed underneath the vessel 200 during loading of the vessel with municipal solid waste and the like.

In accordance with an exemplary embodiment, the handling yoke and frame structure 640 includes a two sets of double servomotor pistons 642, 644, 646, 648, wherein one set of the servomotor pistons 642, 644 is aligned in a horizontal position and the other set (or second set) of servomotor pistons 646, 648 is aligned in the diagonal position. The opening and closing of the door 610 is effected through operation of the pair of horizontal servomotor piston arrangements 642, 644 and the pair of diagonal servomotor piston arrangements 646, 648. The horizontal servomotor piston arrangements 642, 644 move the vessel door 610 in an axial direction away from the front cone portion of the vessel 200. Meanwhile, the diagonal servomotor piston arrangements 646, 648 move the vessel door 610 downwardly and slightly rearwardly. Thus, the vessel door assembly 600 is movable between a first position (i.e., a sealed as closed position) shown in full line configuration in FIG. 1 to a second position (i.e., a stored or open position) shown in the dotted line configuration in FIG. 3.

As described above, in a sealed or closed position, the first or main annular locking ring 620 is engaged with the two flanges 622, 624 in connection with the O-ring to form an airtight seal on the front portion of the vessel 200. In order to remove the door 610 from the vessel 200, the first or main annular locking ring 620 is disengaged from the two flanges 622, 624 by rotating the locking ring 620 in a clockwise or counterclockwise direction approximately 30 degrees (e.g., one notch). The horizontal servomotor piston arrangements 642, 644 move the door 610 away from the vessel 200 in an axially direction. Once the door 610 has been disengaged from the vessel 200, the second or locator annular locking ring 630 rotates and engages the pair of inner flanges 632, 634. Once the second or locator annular locking ring 630 has engaged the pair of inner flanges 632, 634, which are connected to the door 610, and the handling yoke and frame structure 640, respectively, the diagonal servomotor piston arrangements 646, 648 move the vessel door 610 downwardly and slightly rearwardly. The movement of the diagonal servomotor piston arrangements 646, 648 downwardly and slightly rearward stows the door 610 underneath the vessel 200 for loading and unloading of the process material. The steps are performed in the reverse order to attach the door 610 to the vessel 200 for processing of the municipal solid waste (MSW). The rotation of the first or main annular locking ring 620 and the second or annular locking ring 630 are preferably controlled via a pair of hydraulic motor assemblies, which are attached to the vessel 200 and the handling yoke and frame structure 640, respectively.

Figure 8C:
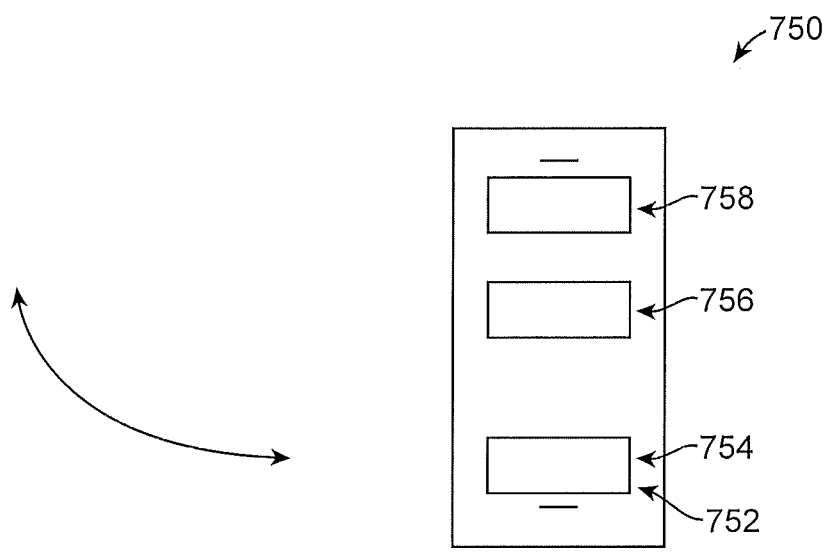
FIG. 8C is a side view of a hydraulic pin actuator, which is attached to the handling yoke and frame structure of the door assembly in accordance with an exemplary embodiment.

FIG. 8A is a side view of the upper door lift frame ram hinge 700 for a servomotor piston arrangement 642, 644 in accordance with an exemplary embodiment. As shown in FIG. 8A, the upper door lift frame ram hinge 700 is attached and/or fixed to the autoclave subframe 680. The upper door lift frame ram hinge 700 includes a first member 702, which extends outward from the subframe 680 to a second member 704. The second member 704 is preferably configured to be attached and/or fixed to a ram hinge 710. The ram hinge 710 includes a plurality of bores or openings, 712, 714, 716, which are configured to receive fixed hinge pins (not shown), and which attaches the ram 710 to the upper door lift frame 650. As shown, the plurality of bores or openings 712, 714, 716, preferably include a first bore 712, a second bore 714 and a third bore 716. The plurality of bores 712, 714, 716 are attached to the hydraulic pin actuator 752 (FIG. 8C) via the fixed hinge pins. The hydraulic pin actuator 752 raises and lowers the upper door lift frame 650 from a first position, which houses the door 610 underneath the front cone portion 210 of the vessel 200 to a second position, wherein the door 610 is attached and/or removed from the vessel 200. The upper door lift frame ram hinge 700 attaches the door handling yoke 640 to the vessel frame 680, which is accurately maintained to the vessel 200 in order to provide proper tolerance and maintain reliability of attaching and/or removal of the door 610 from the vessel 200 in a desired automated mode.

In accordance with an exemplary embodiment, the ram 710 has a relatively flat upper portion 720, which extends outward towards the upper door lift frame 650 to a slightly rounded edge 722. The slightly rounded edge 722 transitions the upper portion 720 to an outer edge 724, which is at approximately 40 to 50 degree angle relative the relatively flat upper portion 720. The outer edge 724 transitions to an outer rounded edge 726. The outer rounded edge 726 transitions to a lower edge 728, which extends towards the autoclave subframe at an approximate 10 to 20 degree angle relative to the relatively flat upper portion 720 to an inner edge 730. The inner edge 730 transitions to an inner bore 732 and to a relatively flat lower portion 734, which attaches to the second member 704.

FIG. 8B is an end view of an upper door lift frame ram hinge 700 for a servomotor piston arrangement in accordance with another exemplary embodiment. As shown in FIG. 8B, the ram 710 is attached to the second member 704 via a suitable connection.

FIG. 8C is a side view of a hydraulic assembly 750, which is attached to the handling yoke and frame structure 640 (not shown) of the door assembly 600 in accordance with an exemplary embodiment. The hydraulic assembly 750 includes a hydraulic pin actuator 752, which raises and lowers the door assembly 600 and door 610 of the vessel 200. As shown in FIG. 8C, the hydraulic pin actuator 752 moves a lower position 754, wherein the door 610 is stored underneath the front cone portion 210 of the vessel to an upper position 758, wherein the door 610 is removed and/or attached to the vessel 200. In addition, as shown in FIG. 8C, as the hydraulic pin actuator 752 moves upward to raised or lift the handling yoke and frame structure 640, the hydraulic pin actuator 752 moves through a series of intermediate positions 756, which correspond to the relative positions of the door assembly 610 as the assembly 610 is raised and/or lowered.

As shown in FIG. 8C, in accordance with a lower position 754, the door 610 and the door assembly 600 are stored underneath the front cone portion of the vessel 200. In a series of intermediate positions 756, the door 610 and the door assembly 600 moves from underneath the front cone portion of the vessel to attach and/or remove the door 610 from the vessel 200. In an upper position 758, the door 610 is attached and/or removed from the vessel 200.

As set forth above, when the vessel 200 is in the loading (filling) or unloading (emptying) mode, the vessel 200 is open and the door 610 is stowed under the front cone portion 210 (or nose cone) of the vessel 200. In the pressurized mode, the door 610 is securely engaged to the vessel 200 using the main annular locking ring 620 with the handling yoke and frame structure 640 engaged with the second or locator annular locking ring 630 with part of the door assembly 600 and which is stowed under the nose cone of the vessel 200. In addition, the door assembly 600 is preferably braced in order to ensure that each of the components and/or parts of the door assembly 600 can be precisely located and relocated to their designated positions as needed.

In accordance with an exemplary embodiment, the door assembly 600 can be fitted with rack and arcuate drives for rotation and locking ring operation in order to assure fit up and limit switch functioning to precise locations that are consistent and repeatable. The rack and arcuate drive system has the benefit of enhanced safety because of the locking feature, which the door assembly 600 may exhibit following loss of power during operation, and avoids the inherent dangers from a large pressurized vessel (or mass) as it rotates within the support frame 300. In addition, the reliability of the door assembly 600 is improved with a number of replacement features available for items subject to wear, and which are important to the desirability of the continuous operational running of the autoclaves and/or vessels 200.

Preferably, a screen (not shown) is positioned over the opening in the vessel 200 door assembly 600 in order to prohibit the passage of large material that may be caught in the slipstream of the venting vapors. The door assembly 600 is removably secured to the open forward end of the vessel 200 so that during operation of the vessel 200, the process material to be treated can be introduced into the vessel 200 and once the material has been treated, the material can be discharged or removed from the vessel 200.

Figure 9:
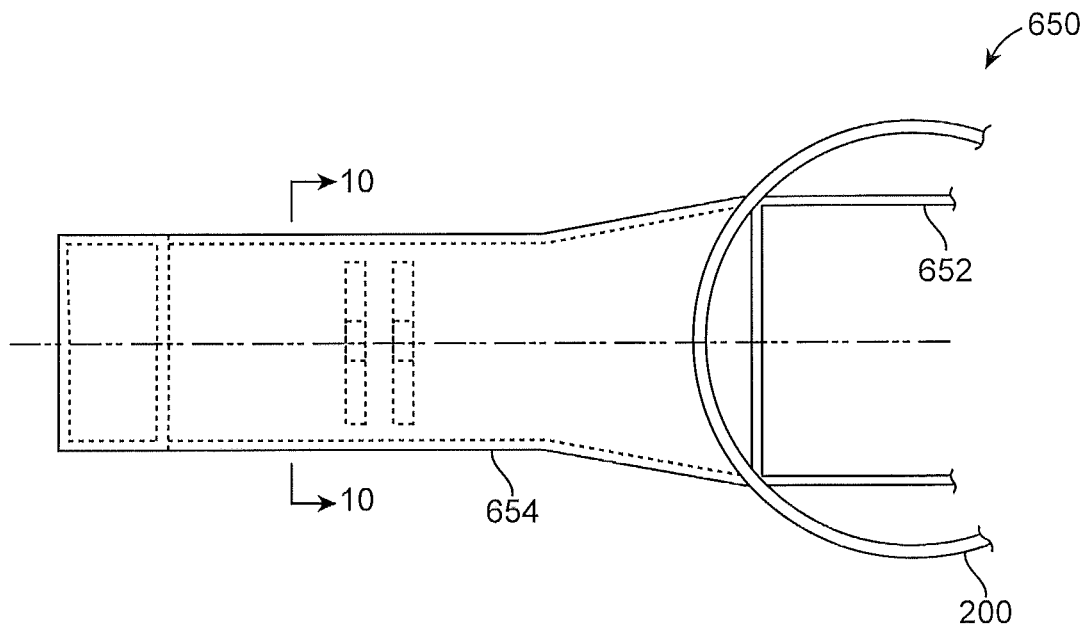
FIG. 9 is an end view of the upper door lift frame of the door assembly as shown in FIGS. 6-8 in accordance with an exemplary embodiment.

FIG. 9 is a side view of the upper door lift frame 650 of the apparatus 100 as shown in FIGS. 6-8 in accordance with an exemplary embodiment. As shown in FIG. 9, the upper door lift frame 650 includes an inner frame member 652, which is configured to engage the second or locator annular locking ring 630, and an outer frame member 654, which engages the second set of servomotor pistons 646, 648, which are aligned in the diagonal position of the door assembly. The inner frame member 652 and the outer frame member 654 preferably have a hollow inner portion and are constructed from steel and/or a steel-based material, which can accommodate the weight of the door 610, which can weigh in excess of eight (8) tons.

Figure 10:
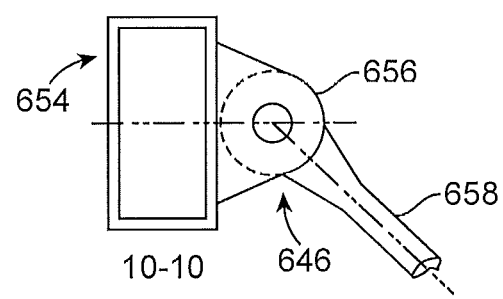
FIG. 10 is a cross-sectional view of the upper door lift frame along the axis 10-10 of FIG. 9.

FIG. 10 is a cross-sectional view of along the axis 10-10 of FIG. 9 showing the outer frame member 654 of the upper door lift frame 650 and the second set of servomotor pistons 646, 648. As shown, the servomotor pistons 646 are connected to the upper door frame 650 via a fixed member 656, which receives a rod or piston 658 and having an articulation thereto, and which provides for the removal and attachment of the door 610 to the vessel 200.

Figure 11:
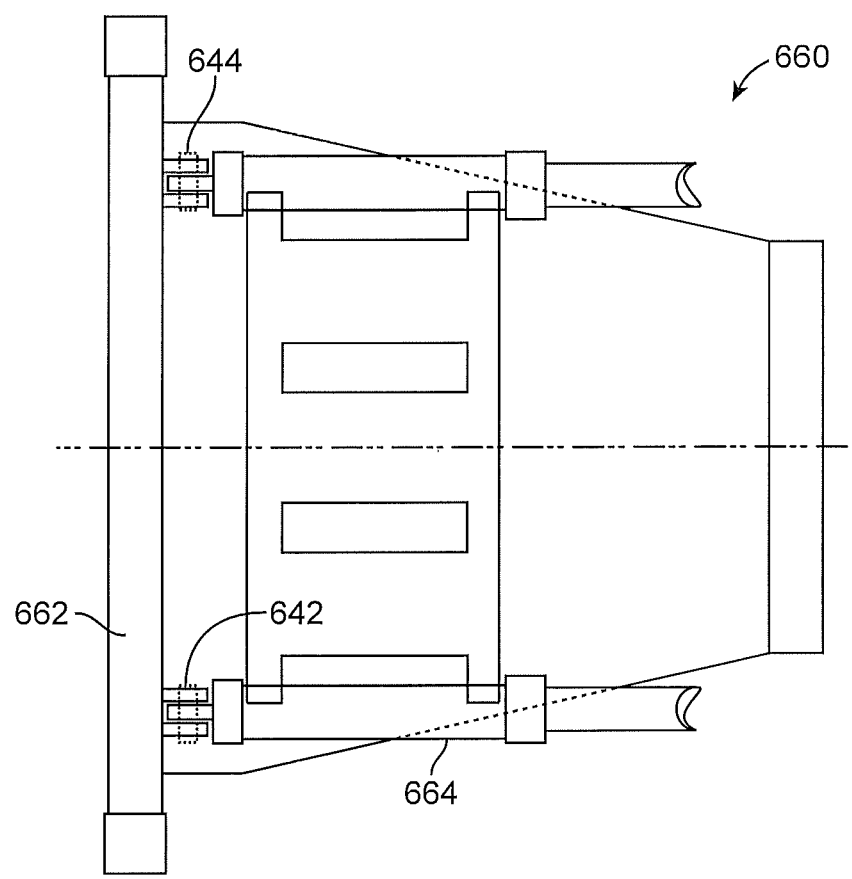
FIG. 11 is a plan view of the lower door lift frame of the door assembly as shown in FIG. 6 in accordance with an exemplary embodiment.

FIG. 11 is a plan view of the lower door lift frame 660 of the apparatus as shown in FIG. 6 in accordance with an exemplary embodiment. As shown in FIG. 11, the lower door lift frame 660 includes a lower frame member 662, which extends underneath the vessel 200 from outer edge to outer edge. The lower frame member 662 is attached to the handling yoke and frame structure 640 via the first set of servomotor piston 642, 644, which are aligned in a horizontal position and a handling yoke member 664. The handling yoke member 664 extends from the servomotor piston 642, 644 to an outer edge of the outer frame member 654 of the upper door lift frame 650.

Figure 12:
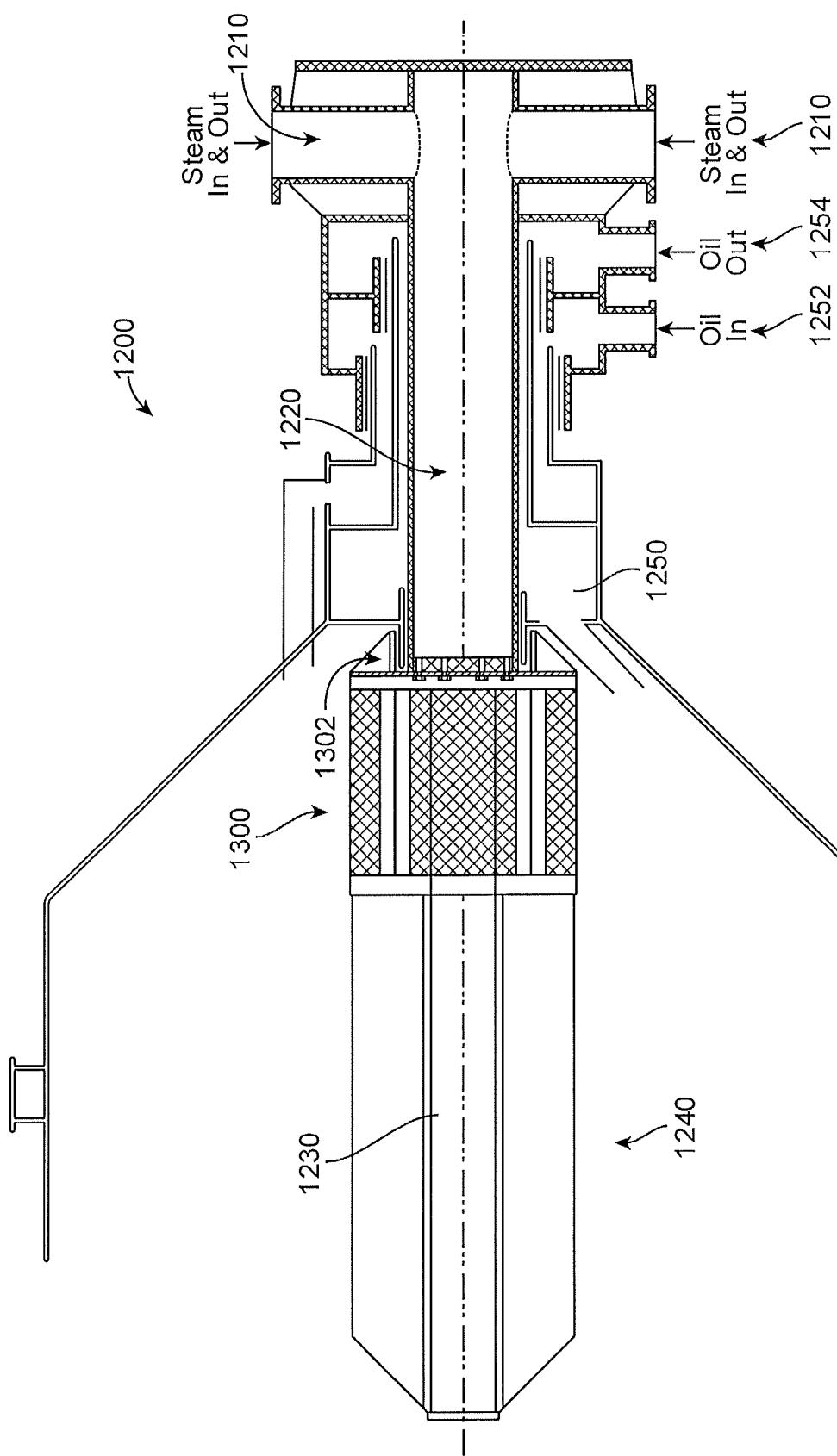
FIG. 12 is a side view of the piping arrangement of the apparatus as shown in FIG. 1.

The apparatus 100 also includes a rotary coupling 1200, which is attached to the rearward end 232 of the vessel 200. As shown in FIG. 12, the rotary coupling 1200 includes two oppositely positioned steam supply inlets/outlets 1210 through which steam can be directed and introduced into the interior of the vessel 200. The steam supply inlet/outlet 1210 is connected to a centrally disposed conduit 1220 of the rotary coupling 1200, which fluidly communicates with a hollow shaft 1230. The hollow shaft 1230 is fixed to the rotary coupling 1200 and extends into a cantilever 1240 fashion into the interior of the vessel 200. The cantilever shaft 1240 extends into the interior of the vessel 200 only for a portion of the longitudinal extend of the vessel 200 (e.g., between approximately fifteen (15) and twenty-five (25) percent of the total length of the vessel 200).

The shaft 1230 is secured to the rotary coupling 1200 by way of a suitable securing device. A radially extending rib on the rearward end 232 of the vessel 200 is positioned between an annular shoulder of the shaft 1230 and an end portion of the rotary coupling 1200. A suitable gland or bearing is positioned between the rib of the vessel 200 and the end portion of the rotary coupling 1200. Suitable packing can also be provided to effect fluid-tightness. In accordance with an exemplary embodiment, the cantilevered shaft 1240 is provided with several radially outwardly directed fins whose purpose will be explained in more detail below. In addition, the shaft 1240 is provided with a plurality of spaced apart openings or jets that communicate with the hollow interior of the shaft 1240. In that way, a heated liquid (or steam) supplied to the inlets/outlets 1210 flows through the centrally disposed conduit 1220 and to the hollow shaft 1230 where the heated liquid (or steam) is introduced into the interior vessel 200 by way of the openings or jets in the shaft 1230. In accordance with an exemplary embodiment, steam is supplied to the inlets/outlets 1210 via a steam supply line (not shown).

Additionally, the rotary coupling 1200 is fixed with respect to the vessel 200 so that the rotary coupling 1200 remains stationary during rotational movement of the vessel 200. In accordance with an exemplary embodiment, the rotary coupling 1200 is held in a fixed and stationary position by way of the diagonally oriented bracing elements. The rotary coupling 1200 is also provided with a liquid supply inlet and a liquid return outlet. The liquid supply inlet fluidly communicates with an annular fluid supply channel formed between the outer surface of the centrally disposed conduit of the rotary coupling and the inner surface of the cylindrical end portion of the vessel 200. The annular fluid supply channel opens into an enlarged annular chamber portion, which communicates with a plurality of fluid transport conduits.

The liquid return outlet is in fluid communication with an annular fluid return channel, which is defined between two longitudinally extending, generally cylindrical extensions at the rearward end of the vessel 200. The annular fluid return channel opens into an annular chamber portion, which also communicates with the fluid transport conduits. The cylindrical extensions at the rearward end 232 of the vessel 200 each have glands or beatings secured thereto. The glands or bearings are provided with a packing to assist in providing a liquid and airtight fit. A suitable securing or fastening mechanism is associated with each of the glands or bearings. Through use of the fastening mechanisms, the rotary coupling 1200 can be secured in place on the rearward end of the vessel 200.

As noted above and as seen with reference to FIG. 12, the annular chamber portions fluidly communicate with what are generally termed as fluid transport conduits. As seen more particularly in FIG. 12, each of the liquid transport conduits 1250 includes a liquid supply conduit 1252 and a liquid return conduit 1254. The liquid supply conduit 1252 fluidly communicates with the annular chamber as seen in FIG. 12 by way of a through-hole provided in the wall at the rearward cone portion of the vessel 200. Likewise, the liquid return conduit 1254 fluidly communicates with the annular chamber by way of a through-hole provided in the wall at the rearward cone portion of the vessel 200. In that way, liquid that is supplied to the inlet in the rotary coupling 1200 will flow into the liquid supply conduit 1252, and liquid in the liquid return conduit 1254 will flow into the liquid return outlet. In the preferred embodiment of the present invention, four (4) fluid transport conduits are provided in the vessel 200 and are appropriately fixed to the interior surface of the vessel 200. One function served by the fluid transport conduits is to transport heated fluid through the interior of the vessel 200 in order to heat and/or dry the material located in the vessel. Oil is the preferred fluid as it can be heated to a higher temperature than other liquids (e.g., water) without creating excessive pressure. In addition, the heated oil preferably flows through the vessel 200 in a turbulent form so as to prevent an insulation layer of heater or hot oil from forming on an outer wall of the heated fluid or liquid transport conduits (e.g., 1510 of FIG. 15). By maintaining the heated oil within the transport conduits 1510 in a state of turbulent flow, the heated oil (or hot oil) maximal heat exchange between the conduit and the materials within the vessel 200 can be achieved. In accordance with an exemplary embodiment, the hot oil preferably has the ability to be heated in upwards of temperatures in the range of approximately 400° F.

The steam supply inlets/outlets 1210 are preferably approximately 12 to 24 inches in diameter depending on the size of the vessel 200. For example, a 12-foot diameter vessel 200 preferably includes a pair of steam supply inlets/outlets 1210 having a diameter of approximately 16 to 20 inches, and more preferably approximately 18 inches in diameter. Meanwhile, the liquid supply conduit 1252 and the liquid return conduits 1254 are preferably approximately 4 to 12 inches in diameter depending on the diameter of the vessel 200. For a 12-foot vessel, the pair of steam supply inlets/outlets 1210 are preferably approximately 6 to 10 inches in diameter, and most preferably approximately 8 inches in diameter.

FIG. 13 is a perspective view of a rotary coupling 1300 in accordance with an exemplary embodiment. The rotary coupling 1300 provides a means for delivering a heated fluid down a central portion thereof 1330 and for withdrawing steam and heat from within the vessel during venting or flashing of the steam and heat. As shown in FIG. 12, the rotary coupling 1300 is preferably attachable to a proximal end 1302 of the cantilevered shaft 1240 portion of the rotary coupling 1200. The rotary coupling 1300 includes a housing 1310 having a plurality of sides 1312 thereto with openings 1314 configured to receive a screen or screen-like material 1320 (FIG. 14). The openings 1314 extend from one end to the other end of the housing 1310. The housing 1310 of the rotary coupling 1300 preferably has at least at least eight (8) sides as shown, which forms an octagon-like drum or cylinder. Alternatively, the housing 1310 can have more or less than eight sides. For example, in accordance with an alternative embodiment, the housing 1310 has five (5) or six (6) sides forming a pentagon or hexagon-like shaped drum and/or cylinder. The proximal end 1304 of the rotary coupling is attached or fixed to the proximal end 1302 of the rotary coupling 1200. A distal end 1308 of the rotary coupling 1300 is fixed and/or attached to the proximal end of the cantilevered shaft 1240.

FIG. 14 is an end view of the rotary coupling 1300 of FIG. 13 with the screen or screen-like elements 1310 in accordance with an exemplary embodiment. As shown in FIG. 14, the screen or screen-like material 1310 are preferably fixed or attached to the housing 1320 via a bolt and/or bolt-like system 1322. The screens or screen-like material 1310 allows the vessel to vent (or draw) steam from the interior of the vessel 200 without pulling out or withdrawing the process material from within the vessel during venting. In accordance with an exemplary embodiment, each of the screens or screen-like material can be replaced as need with a similar mesh size and/or different mesh size as desired. For example, for different types of municipal solid waste, the mesh size of the screens can be changed as needed. In addition, the screens or screen-like material 1310 can be replaced as needed due to damage thereto and/or wear.

Figure 15:
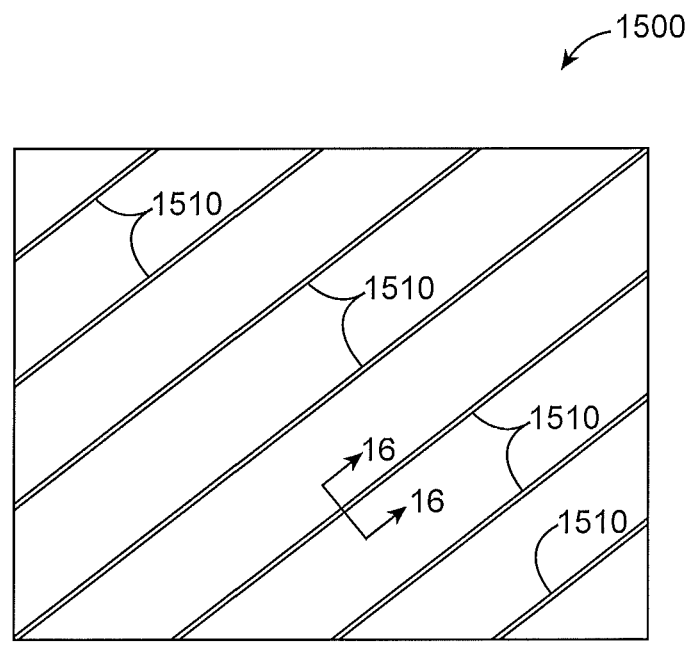
FIG. 15 is a plan view of a portion of the interior of the vessel illustrating the liquid transport conduits.

FIG. 15 is a plan view of a portion of the interior 1500 of the vessel illustrating the heated fluid transport conduits or heated liquid fluid transport conduits (e.g., helices) 1510. As shown in FIG. 15, in the intermediate section 220 of the vessel 200, each of the fluid transport conduits 1510 extends helically through the vessel 200. Preferably, each one of the fluid transport conduits 1510 makes between a 90 degree helical revolution to an approximately 720 degree helical revolution between opposite ends of the intermediate section 220 of the vessel 200, and more preferably between a 180 degree helical revolution to a single complete 360 degree helical revolution between opposite ends of the intermediate section 220 of the vessel 200, and more preferably a 180 degree helical revolution between opposite ends of the intermediate section 220 of the vessel 200. However, the fluid transport conduits 1510 can be designed to complete more or less than a half of a revolution to one revolution within the interior of the intermediate section 220 of the vessel 200. In accordance with an exemplary embodiment, for a 12 foot diameter vessel 200, each of the fluid transport conduits 1510 have a height of approximately 1 to 3 feet and more preferably approximately 2 feet, and are spaced from one another approximately 4 to 8 feet, and more preferably 6 feet apart. The number of fluid transport conduits 1510 is preferably half of the diameter of the vessel 200 (e.g., a 8 foot diameter vessel with 4 fluid transport conduits, a 10 foot diameter vessel with 5 fluid transport conduits, and a 12 foot diameter vessel with 6 fluid transport conduits).

In accordance with an exemplary embodiment, the height of the fluid transport conduits 1510 are approximate ⅙ of the diameter of the vessel 200 (e.g., a 12 foot vessel has fluid transport conduits of approximately 2 feet in height). In addition, the interior and/or exterior surfaces of the vessel 200 can be fitted with a heat plate system (or heat exchange system) to add an additional indirect heat source to the interior and/or exterior of the vessel 200. The heat plate system is preferably comprised of a pair of metal plates, one or both which are embossed, and welded to one another. The embossings form a series of passages through which a heat exchange liquid or transfer media flows. In accordance with another exemplary embodiment, one or more heat sensors and/or pressure sensors can be positioned within and/or on the interior surface of the vessel 200 to monitor the relative temperature of the vessel at various locations.

Figure 16:
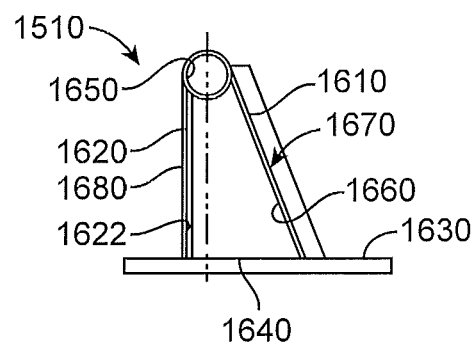
FIG. 16 is a cross-sectional view of a liquid transport conduit.

As seen in FIG. 16, each of the fluid transport conduits 1510 can be defined by two plates 1610, 1620 that are each secured to the inner surface 1630 of the vessel wall 1640 in any suitable manner. The two plates 1610, 1620 project inwardly towards the interior of the vessel 200 and are joined to one another by a pipe-section 1650 having a generally circular cross-section. Thus, the space defined by the two plates 1610, 1620 and the pipe 1650 constitute the liquid return conduits 1660 while the hollow interior of the generally circular pipe constitutes the liquid supply conduits 1600.

The fluid transport conduits 1510 act as a pressure plenum for the heat transfer medium and also provide significant stiffening to the wall of the vessel 200. In the intermediate section 220 and the rearward cone section 232 of the vessel 200, at least one of the plates 1610, 1620 are preferably provided with heat transfer fins (or ribs) 1670 (FIG. 16), which facilitates the transfer of heat to the interior of the vessel 200 and the process material (or MSW) located in the vessel 200. The fins (or ribs) 1670 also help agitate and condition the process material (or MSW) through direct physical contact with the material. Preferably, the fluid transport conduits 1510 are designed to transport fluid from the rearward cone portion 230 to the forward end of the intermediate section 220. The portion of each fluid transport conduit located in the front cone portion is preferably not in fluid communication with the respective remaining portion of the fluid transport conduit. Thus, each of the fluid transport conduits is designed to transport heated fluid through the rearward cone section and the intermediate section, but not through the front cone section. Thus, within the front cone section of the vessel 200, the fluid transporting member serves the primary function of a material contacting member.

For each fluid transport conduit, the liquid supply conduit and the liquid return conduit are entirely separate from one another except at the forward end of the intermediate section 220 of the vessel 200 (i.e., the end of the intermediate section 220 adjacent the forward cone section). At the forward end of the intermediate section 220 of the vessel 200, the liquid supply conduit is in fluid communication with the liquid return conduit. Thus, heated fluid supplied to the liquid supply inlet flows from the rearward cone section of the vessel 200 to the forward end of the intermediate section 220 of the vessel 200 by way of the liquid supply conduit. Upon reaching the forward end of the intermediate section 220, the heated fluid flows into the liquid return conduit where it flows back towards the rearward cone section of the vessel 200 and is discharged by way of the liquid return outlet. The liquid supply conduit and the liquid return conduit are specifically designed so that fluid flowing there through remains separate from and does not contact the material in the vessel 200.

As noted above, within the intermediate section 220 of the vessel 200, the fluid transport conduits extend in a helical manner. In the rearward cone section 212 of the vessel 200, the fluid transport conduits are arranged as short helices in order to help expedite the initial breakdown of the material during filling of the vessel. In the forward cone section of the vessel 200, the fluid transport conduits extend in a generally helical manner, although somewhat differently than in the intermediate section 220, in order to assist the unloading movement of the materials from the vessel.

In accordance with an exemplary embodiment, in the intermediate section 220 and the rearward cone section 232 of the vessel 200, the plates which define the liquid return conduits are arranged with respect to the vessel wall to form an angle of approximately 115 degree on the rearward end side and an angle of approximately 90 degree with respect to the forward end side. As will become apparent from the description below, such a disposition of the plates is advantageous in assisting movement of the material within the vessel 200 during rotation of the vessel. In addition, the arrangement and disposition of the fluid transport conduits within the intermediate section 220 is designed to achieve significant cascading and lifting of the material within the vessel 200, and less longitudinal movement, thereby resulting in optimum tumbling. In addition, the inclination of the plates on the rearward end side helps compress, but preferably not lock, the material as the material is being loaded into the vessel. Within the front cone section 210, the plates can form an angle of 110 degree with respect to the vessel wall at the rearward end side and an angle of 70 degrees with respect to the vessel wall on the forward end side. The arrangement and disposition of the material contacting member serves to facilitate the unloading of the material from the interior of the vessel by counteracting the additional lift that results from the way in which the wall of the front cone section converges towards the centerline of the vessel 200.

In accordance with another exemplary embodiment, a high temperature oil is supplied as an indirect heat source from a heat oil source, which provides the main mixing and tumbling action that either absorbs or generates the direct heat from the steam involved. The high temperature oil (i.e., indirect heat source) can provide a significant impact on the rate of heat-up and/or cool down phases and the cycle time, which determines throughput capacity. In accordance with an exemplary embodiment, the front of the vessel 200 as it articulates drops to about twenty-five degrees below the horizontal in order to fully form the cavity in the rearward of the vessel, which accommodates the exhausting steam delivered to the interconnecting headers.

In accordance with an exemplary embodiment, as set forth above, the helices are arranged with one face smooth 1622, which helps to transfer the heat from the indirect heat source on the smooth side, by a wiping action. On the other side the fluid transport conduits (or helices) 1510 are fitted with projecting fins 1670, which break up the biomass in order to rapidly release the direct heat source if in the steam generating mode or if in the condensing mode absorb this direct heat source. These features when coupled with the appropriate rotation both for direction and speed of the vessel 200, which can be varied to suit the desired treatment of the waste contents allows these contents to move longitudinally and transfers the heat energy efficiently.

In accordance with an exemplary embodiment, the plate 1620 opposite the plate 1610 fitted with the projecting fins 1670 can be include a heat plate system 1680. The heated plate system 1680 is preferably comprised of a pair of metal plates, one or both which are embossed, and welded to one another. The embossings form a series of passages through which a heat exchange liquid or transfer media flows. In accordance with an exemplary embodiment, the heat exchange liquid is a hot oil, which transfers heat to the interior of the vessel 200. For example, the plate system 1680 can be a panel produced by Platecoil® that can be sized to fit the curved surfaces of the autoclave 200 and likewise the helices 1510. In accordance with an exemplary embodiment, the hot oil is preferably maintained within the plate system 1680 in a turbulent flow condition, which provides increased and/or improved heat exchange between the hot oil within the plate system 1680 and the materials within the vessel 200.

In accordance with an exemplary embodiment, the panel arrangement preferably includes at least four to six helices for a vessel 200 having a diameter of approximately 8 to 12 feet, which are anchored to the body of the vessel 200 using a system that allows the heat expansion growth of these panels to be adequately accommodated for within the temperature range experienced during operation. Panel arrangement with replacement provisions allow a fast replacement in the event that an oil leakage does occur during plant operation but here again the use of hot oil as the preferred liquid with low operating pressures significantly reduces this probability.

Figure 17:
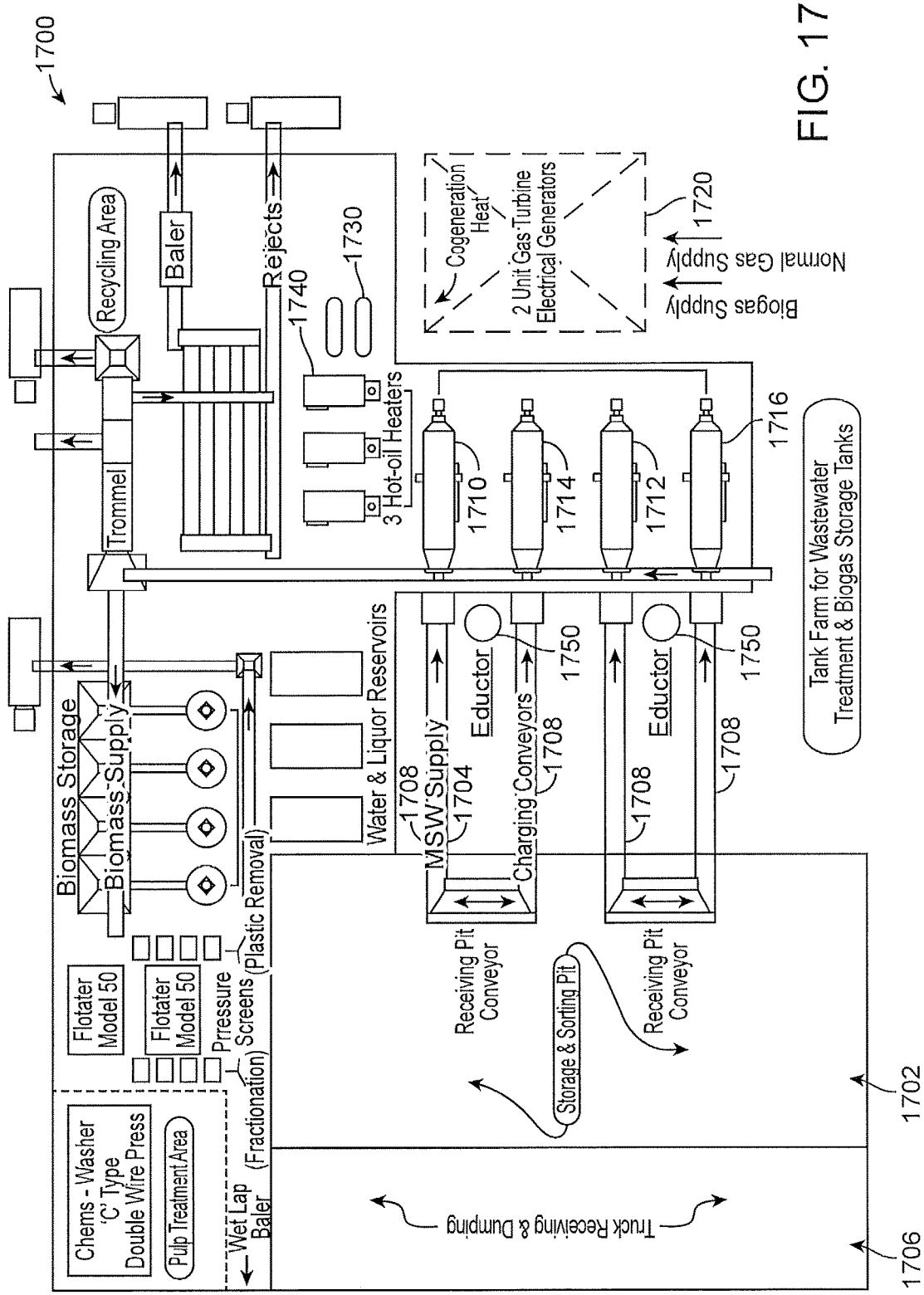
FIG. 17 is a schematic diagram of a four-vessel system in accordance with an exemplary embodiment.

FIG. 17 schematically illustrates a system 1700 that includes four interconnected vessels 1710, 1712, 1714, and 1716. The system 1700 also includes a storage and/or starting pit 1702, wherein process material, which is preferably in the form of municipal solid waste (MSW) 1704 is delivered for treatment. The municipal solid waste 1704 can arrive and be delivered to the treatment plant from municipal trucks, railcars and/or any other type of waste delivery system to a truck receiving and dumping area 1706. In accordance with an exemplary embodiment, the municipal solid waste 1704 is placed on a conveyor belt system 1708, which delivers the process material (e.g., municipal solid waste) 1704 to the one of the four interconnected vessels 1710, 1712, 1714, 1716.

The system 1700 includes a source of steam (or heated liquid) 1730 and one or more hot oil heaters 1740. In addition, the system 1700 also includes the piping scheme for each vessel 1710, 1712, 1714, 1716, and wherein each of the vessels 1710, 1712, 1714, 1716 preferably includes a supply line and a supply valve, which supplies the source of steam 1730 and the one or more hot oil heaters 1740 to each of the vessels 1710, 1712, 1714, 1716. A plurality of regulating valves movable between an open position and a closed position direct the flow of fluid (i.e., heated liquid and/or steam) through the system 1700. The regulating valves are preferably connected to a controller, which controls the valves and which can control the overall operation of the system 1700. The supply lines and supply valves are all preferably provided with swivel joints, which allow sections of the lines to move relative to one another during operation of the vessel to accommodate various movements of the apparatus 100.

The rearward cone portion 230 of each vessel 1710, 1712, 1714, 1716 is preferably provided with a vacuum regulator for regulating air input into the vessels during the cooling and drying stages of operation as will be discussed in more detail below. In accordance with an exemplary embodiment, the system 1700 preferably includes a vacuum regulator, which can include a vacuum breaker, which can be set to allow air to be input into the respective vessels 1710, 1712, 1714, 1716 when the pressure inside the respective vessel becomes less than a set pressure (e.g., 10 or 5 psi below atmospheric). Preferably, the vacuum regulator is connected to a control system, which allows the point at which the vacuum regulator is made operational to be varied. The vacuum regulator is preferably positioned in the rearward cone portion of the vessel 200. In accordance with an exemplary embodiment, a steam vent header is connected to an eductor 1750 by way of a connecting line. A venting valve can be disposed in the connecting line and can be connected to a controller, which serves to open and close the venting valve. The eductor 1750 serves to condense steam by spraying water on the steam passing through the connecting line. In accordance with an exemplary embodiment, water is supplied from a condensate tank and is directed to the eductor 1750 through a pump and an eductor valve. The collapse of the steam in the eductor creates, in effect, a vacuum, which draws steam from the steam vent header. Additionally, if the regulating valve is open, the eductor 1750 tends to draw steam out of the interior of the respective vessel 1710, 1712, 1714, 1716.

In accordance with an exemplary embodiment, the operation of each of the vessels 1710, 1712, 1714, 1716 and system 1700 as a whole will be described in connection with the treatment of waste material (e.g., municipal solid waste), but it is to be understood that the vessel 1710, 1712, 1714, 1716, and system 1700 could also be used to treat other materials as well.

In accordance with an exemplary embodiment, the system 1700 includes a four-vessel plant, which can be housed within a main building. The main building preferably includes a spreading floor, wherein the material is delivered and placed on one of a plurality of conveyor systems, and a main machine hall, which houses the plurality of vessels 200. In accordance with an exemplary embodiment, the main building is preferably arranged in a manner to allow separate air ventilation for the spreading floor with the loading hoppers for the autoclaves, and the main machine hall, which houses the vessels, such that the spreading floor and main machine hall are independent of one another. In addition, the separation of the spreading floor and the main machine hall keeps the working environments apart so that dissimilar duties are carried out by the operating staff as they perform their different tasks. Likewise, the remaining parts of the buildings can have various levels of separation. For example, the building can include a separate section and/or building where material is separated by size for recycling and the biomass is rinsed and prepared for commodity sale.

In accordance with an exemplary embodiment, the system 1700 also includes a cogeneration plant 1720, which receives a supply of biogas and/or natural gas. The supply of biogas and/or natural gas is preferably supplied to an electrical generator in the form of one or more gas turbine electrical generators, and more preferably, a 2-unit gas turbine electrical generator. The system 1700 also preferably includes an area for a tank farm where process water is treated for reuse and the biogas can be stored, which is conveniently supplied to the cogeneration plant 1720. The cogeneration plant 1720 is preferably a separate building within the complex. Other major pieces of equipment include an eductor system 1750 along with the size separation trommels.

In accordance with an exemplary embodiment, the hot oil heaters 1740, which provide the source of the indirect heat for the autoclaves 1710, 1712, 1714, 1716 are preferably conveniently located near the cogeneration plant 1720 where industrial heat is produced along with green electricity. Truck access is generally peripheral to the building complex with the municipal solid waste (MSW) being delivered to the multiple doors above the spreading floor where the first level of inspection is carried out by the loading operation team.

The system 1700 also includes a spreading floor adjacent to the autoclaves where packer trucks can offload for about eight hours each day on a six-day week basis to a spreading floor is desirable. The spreading floor should have a capacity large enough to store the twenty-four hour volume required to feed the four autoclaves including a seventh day storage. In accordance with an exemplary embodiment, each of the plurality of autoclaves 1710, 1712, 1714, 1716 operate on a 24 hours per day, seven days per week scheduled to provide a constant supply of treated process material in the form of pulp to a paper production facility and/or for biogas production. As shown in FIG. 17, vessel 1 (1710) and vessel 3 (1714) are located adjacent to one another, and vessel 2 (1712) and vessel 4 (1716) are adjacent to one another. In accordance with an exemplary embodiment, the vessels 1710, 1712, 1714, 1716 are preferably loaded in the following order vessel 1 (1710), vessel 2 (1712), vessel 3 (1714), and then vessel 4 (1716). Accordingly, by arranging vessels 1 and 3 adjacent to one another, and vessels 2 and 4 adjacent to one another, the loading and unloading of the vessels 1710, 1712, 1714, 1716 can be performed, even if a delay occurs with one or more of the vessels 1710, 1712, 1714, 1716.

A loading operation team consisting of two large sized rubber tired loaders with some floor inspection will move the dumped MSW 1704 to the loading conveyors 1708 where two walking floor hoppers each serving two vessels will feed the conveyors 1708 supplying their inclined autoclaves 1710, 1712, 1714, 1716. At the top of each conveyor the belt 1708 transitions into a separate wetting chamber where the water including the WAS (waste activated sludge), where it is available, is transferred into the mouth of the rotating autoclave 1710, 1712, 1714, 1716. In accordance with an exemplary embodiment, during this floor operation over-sized objects are moved to the sides for separate disposal and excess municipal solid waste (MSW) is stockpiled for later use that same day and/or at another time. At the point where the autoclave 1710, 1712, 1714, 1716 reaches the predetermined weight determined by the load cells on the autoclave wheels, the conveyer belt 1708 is stopped and remains loaded until the same autoclave returns about two hours later for reloading.

In accordance with an exemplary embodiment, the cycle time preferably includes one additional monitoring step, wherein an operator can observe the loaded belt as the conveyor belt 1708 leaves the walking floor vessel. An inspection walkway preferably traverses the four loading belts 1708 allowing an inspector to continuously observe and/or view the municipal solid waste (MSW) load in order to pick up unacceptable articles missed from previous inspections before reaching the autoclave. From this station, an operator can stop the conveyor 1708, remove any unacceptable objects by using a suitable device, such as, a portable hook device, and convey the unacceptable objects to the side for separate disposal.

In accordance with an exemplary embodiment, the loading conveyor 1708 passes the waste to the main mechanical building housing the plurality of vessels (or autoclaves) 1710, 1712, 1714, 1716 where a separate set of operations can be carried out related to the reforming of the waste using the pressure and vacuum treatment described above. Here the aggregation of high technical equipment including automation is incorporated into an interaction along with the four individual vessels 1710, 1712, 1714, 1716 all sharing common services. The introduction of high temperature oil the primary heat source typically requires that the distribution between the hot oil heaters and the various units be run and/or operated in service galleries below the operating floor. Likewise piping for the eductor system 1750 along with the steam transfer piping between vessels or autoclaves 1710, 1712, 1714, 1716 should be routed in these same service galleries including a connection to the cogeneration plant 1720. This avoids congestion particularly at the operating level keeping this area relatively clear and visible from the remote control room where the operating staff is located. The service gallery also provides improved access for maintenance and servicing operations and allows for the separation preferred in order to minimize exposure to operational accidents.

In accordance with an exemplary embodiment, the vessels 200 are preferably design to cover potential wear or erosion factors during the extended operation that these vessels will be subjected to on a seven-day week basis. In addition, adequate stiffness in the support framing to ensure that the machined components supporting the rotating and articulating portions of this equipment operate within acceptable tolerances. In particular, regard should be given to the rotary coupling support at the rearward of the autoclave as the autoclave operates as a third bearing in line with two other larger bearings each having a disproportionate amount of rotational mass in line as they support this machine. Although the treatment of the contents is intentionally arranged to be gentle to minimize any fragmentation that could seriously impede future debris removal in the process the autoclave experiences significant dynamic impact from the necessary tumbling action sought from the helices. This is the reaction that the support frame has to resist from the two main steel tire bearings combined with the thrust bearing retaining the vessel in a horizontal plane.

In accordance with an exemplary, the process described above is exclusively related to the treatment of municipal solid waste (MSW) wherein the system seeks to recover cellulose as a commodity, which addresses the debris removal along with the physical separation of the solubilized organics from the cellulosic pulp. The overall process is generally described as the wet process to separate it from the autoclave process which is essentially dry and which relies on the steam atmosphere created under pressure to reform the contents not unlike a pressure cooker. The method, apparatus and system for processing municipal waste from a biomass that has been treated in a steam autoclave and follows up with a dilution tank process in hot water allowing further separation. This hot water process allows us to remove undesirable debris such as glass, grit and low temperature plastics and finally separate the solubilized organics from the desired cellulose fibers now available as a valuable commodity.

The indirect heat oil is introduced to the liquid supply conduits (or plenums) where the sticking of certain low melt point plastics to the heated surfaces now continuously wet was avoided. More importantly, the heat transfer rate was significantly increased by subjecting the contents to a wiping motion over the wet heated surface. In the case of the cool down or flashing mode where the material was required to be opened up thereby allowing the vessel to act as a steam generator, the helice surfaces can be used to break up the contents exposing them to the saturated steam atmosphere in order to release the heat more rapidly.

In accordance with an exemplary embodiment, the compaction carried out during the filling mode over fifty percent of the vessel volume is a space after cooking is completed, which favors expeditious steam removal from the flume already incorporated into the shear spline as mixing and tumbling continues. From the heat cycle figures the large tonnages of steam being transferred from and to the autoclaves indicate the large amounts of energy in motion taking advantage of the change of state with no steam boiler required. Equally important is the speed that this heat transfer can be carried out which is indicative of the large heat sink resident in these hot vessels entering into the heat removal mode with an equally receptive sink available in the cool vessel. In accordance with an exemplary embodiment, the cycle time obtained along with the high-energy recovery achieved is favorable for the four-vessel embodiment, a system having an adequately large steam interconnecting flumes coupled with the eductor thereby increasing the steam flow from the relatively small pressure differential available between the two or more connected vessels.

In accordance with an exemplary embodiment, a hybrid anaerobic digester concept, which produce a biogas combined with a high quality soil amendment and where such a commodity was sought for agricultural purposes is desirable. However to meet the primary and immediate needs of metropolitan areas it would be preferable to stay with the proven Biothane system or like system, particularly as the system uses less tankage and space and has demonstrated its ability to incorporate the inclusion of WAS in the liquor obtained from the autoclaves. For example, the step can be a motivating influence, which brings the full range of municipal waste together in our proposed system as a comprehensive package still retaining flexibility in the range of added value products offer to make this necessary change financially attractive and at the same time remove the need for a carbon tax.

In accordance with another exemplary embodiment, to accommodate the use of municipal waste that has to be treated, it is desirable to quantify the waste activated sludge (WAS) behavior in both consistency and chemical composition. This requirement allows the operator to provide optimum benefits from the carbohydrate solution in the form of a brown liquor fed into the anaerobic digester, which can be passed through a dissolved air flotation unit prior to the digester. This step is important to the optimum production of biogas (Biologically Derived Natural Gas) where separation of the lignocellulose pulp properly cleaned from the brown liquor is carried out in the rinsing cycle.

In accordance with an exemplary embodiment, a certain amount of water chemistry has to be observed at this step to ensure that this combined liquor created from the dissolved components of municipal solid waste (MSW) and waste activated sludge (WAS) in the autoclave does provide the anaerobic micro-organisms with a properly prepared feedstock. As mentioned above, the digester for the gas production can be a Biothane® Upflow Anaerobic Sludge Blanket Unit®. This in turn will ensure the fast return of the process water following an aerobic polishing step where it can be reintroduced to the rinse cycle with a large supply of biogas now available for electrical cogeneration. The process also provides a fast turnaround for recycling the water, which has greatly reduced tankage demands compared to other digestion systems. In addition, the method and system provides the operator with electrical independence by supplying industrial heat for the autoclave hot oil system. After taking care of the energy demands for the full plant, a significant amount of green electricity can be available for sale to the grid, which can provide a valuable revenue stream coupled with food waste conversion at the early stages of this process. In accordance with an alternative embodiment, the system can be designed with a hybrid digester, which in some circumstances is better suited for rural America and possibly certain developing countries where commodities along the line of soil amendments are being sought.

The high-rate anaerobic digesters studied over an extended period were finally concluded by using the embodiment of the Biothane Upflow Anaerobic Sludge Blanket Unit, which can optimize the benefits for this process. Such a teaming has been able to establish a process to manage these two dominant waste streams and produce a number of high value commodities that can reduce present municipal costs and still meet fully all environmental requirements.

In accordance with an exemplary embodiment, the addition of a wetting agent from a waste activated sludge to the autoclave 100 while it is being filled with municipal solid waste (MSW), provides the necessary moisture to bring the contents up to the proper consistency for pulping. Also at this point in the process, the chemical nutrient level aggregated in the mixture from the water chemistry sampling carried out at frequent intervals, which can be adjusted to suit commodities being pursued. In accordance with an exemplary embodiment, the temperature within the vessel 200 is increased to a desired range, which does not exceed a maximum temperature or level, and held within the desired range for a prescribed duration. For example, for pulping of paper products, the temperature within the vessel preferably does not exceed 272° F. (e.g., melt point of lignin within the pulp and/or paper). Alternatively, the temperature within the vessel can be designed and/or programmed to reach upwards of 292° F. or higher, e.g., for treating diseases such as mad cow and *Escherichia coli* (*E. coli*), sanitization or sterilization of medical devices and the like. During the processing of the process material, the vessel 200 is rotated about its longitudinal axis such that during the condensing mode the helice rotation allows the fins to break up the process material and accelerate the condensing as well as the dissolving of the tumbling mass fraction of carbohydrate materials. In addition, the release of steam via flashing or steam explosions (e.g., a violent flashing or boiling of water into steam) can be used to treat and/or remove unwanted organisms from the process material. For example, process material can be sterilized through one or more steam explosions or flashing of steam from within a vessel 200.

During part of this process treatment the contents (i.e., process material) will be pushed along the smooth side of the helice in order to wipe the heat off of this surface as part of the heat exchange method which increases the heat transfer rate. This stage is also dependant on the correct moisture content being present in the material, which is now at its maximum along with having a saturated steam environment free from air. Water content present at this point of maximum prescribed temperature is an important element or key to the pulping quality required and is calculated based on the known amount of inherent water present at filling and the need to reach approximately sixty percent (60%) water in the biomass fraction. In accordance with an exemplary embodiment, water transfer from the two hot autoclaves is calculated and the balance required is added at the filling in order to arrive at this desired level of consistency and the high transfer rate achieved allows the avoidance of a separate steam boiler. In accordance with an exemplary embodiment, numerous tests were run to establish the variations of moisture content within the delivered municipal solid waste (MSW) and with the exception of fast food or restaurant facilities variations were well within the limits needed to meet the pulping criteria. In addition, in accordance with an exemplary embodiment, when waste activated sludge (WAS) is included, the biogas production is increased by approximately twenty percent (20%). At the lower temperatures of cooking, heat is supplied sequentially from each of the two other autoclaves under pressure in the form of steam releases as they move through the cool down or flashing mode with the final topping off and actual cooking using only the indirect heat source. In accordance with an exemplary embodiment, maximum temperature attained and duration held is often predetermined based on the downstream commodity prescribed and also the sanitation or sterilization effects sought to combat pathogens and parasites. These variations are readily attained with the apparatus and computerized programs included in the process and the larger autoclave vessels more readily bridge the variations between delivery trucks.

In the past, autoclaves have normally relied on direct heat to provide the heat energy in the form of steam from boilers which was normally the prime mover in the process but when it was applied to MSW treatment the inability to produce a dry enough product became a problem. The four-vessel configuration uses an indirect heat source (e.g., hot oil) that combines the drying process into a single operational entity without going to an independent drying process. If a separate drying process was required, in addition to adding more cost, the separate drying process can extend the cycle time, which can have a significant reduction in throughput capacity with very little energy recovery and all with a significant increase in capital and operating cost. The systems and methods as described herein allow the organic fraction from the inorganic fraction using the pulping action built into the autoclave along with the indirect heat features. In accordance with an exemplary embodiment, the system and method described herein focuses on the presence of two constituents that were dominant in MSW these being food waste and paper waste both carbohydrates but each behaving differently when subjected to heat and pressure when coupled with moisture. The preferred linkage between moisture and temperature demonstrates the need for a higher moisture content being required to accomplish a complete repulping. This same moisture level was equally important in solubilizing the food waste and was particularly effective when carried out at the higher temperature level allowing significant enhancement of the finished product to occur, which will be further explained below.

In accordance with another exemplary embodiment, the methods and systems described herein have been developed to incorporate the other constituents in MSW in such a way that the size separation after autoclaving would be successful and allow the fraction other than the biomass (or renewable energy source) to be easily handled for further recycling thereby ensuring that the landfill diversion rate can be maximized. The biomass includes biological material from living, or recently living organisms. Delivery to the trommel in a sufficiently dry state to allow size separation through the various screen sizes without sticking is the second control point where the moisture content is critical and the contents are now cooled down to a desired exit level that reduces moisture emissions from the conveyor system. For example, the size separation of the MSW in a sufficiently dry state allows size separation on trommels having a screen size of approximately ½ (0.5 inch) and 2.0 inches. Alternatively, different sizes screens and more or less screens can be used. In a preferred process for the pulping or paper industry, the systems and methods as described herein produce a biomass, which has been dried to a desired state, so as to provide for approximately 60% (percent) of the organic material to be sifted through the ½-inch screen, and an additional 10% through the 2-inch screens. The remaining 30% (percent), which will typically include the inorganic material (or "overs") continues onward through the trommel stations to be disposed through further recycling systems and methods. The trommel system preferably includes one or more rotary brushes to assist with the separation of the organic material from inorganic material through the ½ inch and 2 inch screens.

Before the door is removed, the moisture within the vessel has to be reduced to an acceptable level, which is carried out using a combination of the flash mode and cool down phases developed between the autoclaves where one vessel would act as a heat removal sink to allow the connected vessel to vent a portion of the heat and moisture within the vessel and gradually cool down. In accordance with an exemplary embodiment, a certain amount of variation was allowed for in this process in order to accommodate moisture differences between incoming loads, which has a fairly broad band of acceptable limits, which in turn minimizes changes required to the automated settings for process control purposes. For example, in accordance with an exemplary embodiment, the process material (or biomass) is removed from the vessel 200 at approximately 120° F. to approximately 190° F., and more preferably approximately 150° F. to approximately 160° F.

In the final stage, the maximum moisture content is present just before the flashing operation starts and the system enters into the moisture removal step and the indirect heat continues to be supplied to the hot vessel (or autoclave) as the steam is transferred at a faster rate to the cooler vessel (or autoclave). These vessels 200 are preferably in an equal and opposite mode, which is also the beginning of reducing the total heat sink content in the hot vessel with the drying stage started with steam removed being vented or passed to the cooler vessel now entering the cooking stage. This next period continues and the contents in the hot autoclave 100 continue to be dried and cooled as the moisture is removed and added to the cooler autoclave. The differential pressure between the autoclaves 100 is now gradually reducing and finally the hot autoclave still in the cool down mode is reconnected to the eductor system for the final part of the cooling and it is now taken well below the boiling point once in the vacuum cycle. When the final drying is completed the interior pressure is equalized allowing the door to be removed for emptying which is the end of the pressure cycle for that vessel which is picked up again thirty minutes later after filling for a new run. Although, the system is described with the use of a four-vessel system, the system can be operated with more or less than four vessels (or autoclaves) and the advantages of the systems 100 as described herein can be obtained.

Figure 18:
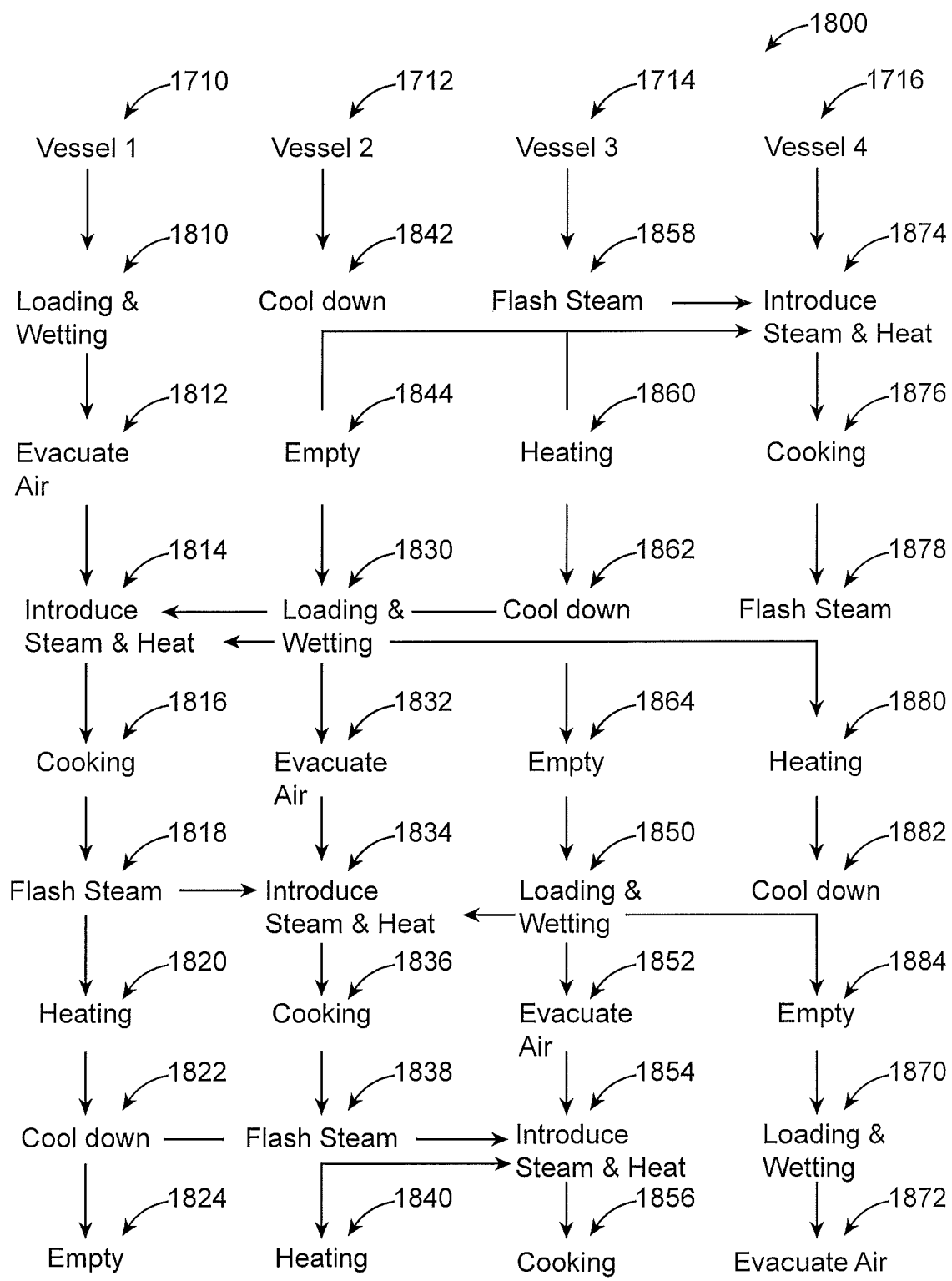
FIG. 18 is a flow chart of a four-vessel system in operation in accordance with an exemplary embodiment.
Figure 19:
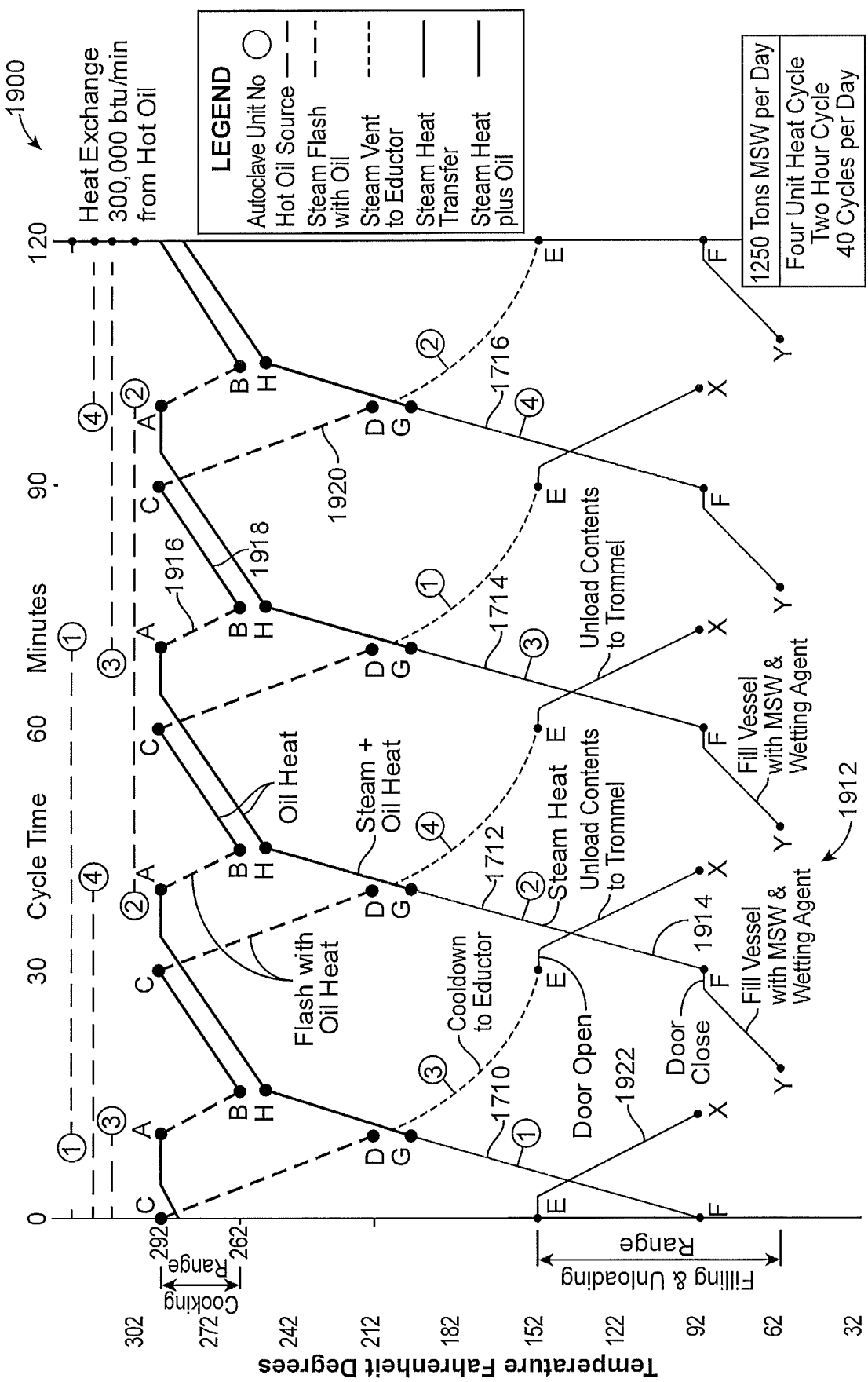
FIG. 19 is a chart illustrating the mode of operation of the system illustrated in FIGS. 17 and 18.

As shown in FIGS. 18 and 19, each of these steps are illustrated in the four-vessel heat cycle chart where a two hour cycle time demonstrates a separate load being made available for size separation every thirty minutes and because half of the time under pressure is in the drying mode when emptied the contents readily pass through the smallest opening screen in the size separation trommel. In accordance with an exemplary embodiment, the quality of the secondary fiber recovered exhibited improved freeness increasing its value to the paper industry and is attributed to the flashing stage used in drying. This same part of the treatment accelerates the breakdown of the waste, however it exerts a gentle overall action that does not further contaminate the contents often done by other separation techniques. In accordance with an exemplary embodiment, the vessel 200 is preferably operated at approximately 50 to 70 percent full by volume, and more preferably approximately 60 percent, which can produce a high quality pulping product.

Where a dryer biomass is sought or a batch is inadvertently wetter than normal, an adjustment to the indirect heat source duration can be made, which will extend the cool down period giving the contents additional drying time. For example, prior to the door removal the autoclave 100 has been in a pressure or vacuum cycle for about ninety minutes out of the two hours total, which in addition to drying the contents allows all of the emissions during the treatment to be fully enclosed and vented through a filter system. In addition, the four-vessel layout provides for the operator to direct the heat energy of two vessels when combined with the eductor system to extract a larger amount of moisture than that added from steam transfer. The final drying through the eductor system preferably provides a higher quality water than that added as a wetting agent a benefit that should not be overlooked when consideration of the total water demands of the process are made. An additional monitoring device is also preferred on the autoclave to signal the presence of undesirable emissions that may be present before the door is removed. Although, the probability of this occurring is very low due to the heterogeneous nature of municipal solid waste material (MSW) and its diverse sources. However, such precautions are prudent and provisions are desirable, and if this occurs, the load is preferably isolated for separate handling. In accordance with an exemplary embodiment, hoppers and conveyors receiving the treated waste are preferably equipped with covers to ventilate these materials as they are further processed in the plant in order to secure the working environment.

The vessels 200 can also be designed to allow chemicals to be introduced into the interior of the respective vessels for purposes of treating the process material. For example, the rotary coupling at the rearward cone portion of the vessel 200 can be provided with another inlet to which is connected a line for introducing such chemicals into the vessel interior. The chemicals would then be sprayed into the vessel interior by way of the jets or openings in the cantilevered shaft. In addition, chemicals can be introduced through the forward cone end of the vessel when the process material to be treated is being introduced into the interior of the vessel.

As noted above, the material that has been unloaded onto the conveyor can be conveyed to a sorting and separating station where standard screening equipment can be employed to further separate and sort the various components using trommels, vibratory screens or other equipment. Through achievement of an optimum moisture condition in the biomass during the drying phase, it is possible to utilize such screens to readily separate the organic biomass from the inorganic portion. Standard metal separation equipment such as cross belt magnets and eddy current separators combined with air density separators permits feedstock streams to be collected and stockpiled or baled for downstream use. This is particularly useful for the separated biomass, which can be further processed for a number of uses, which may vary to suit various market needs. These varied market needs can include, among others, long fiber for the paper industry, a feedstock for glucose manufacture, a biofuel for steam generation and/or a base material for composting. A number of processes can also be employed to utilize the significant food waste that is solubilized in the biomass moisture after the steam process. For example, one can use the treated material as a source of methane for boiler fuel use, for steam generation and/or for heat exchange liquids. Prior to the aforementioned separation methods, a suitable separating device providing three size distributions (e.g., over two inches, between two inches and one-half inch, and below one-half inch) can be employed to achieve an adequate size classification.

FIG. 18 is a flow chart 1800 for a four-vessel system 1700 in operation. As shown in FIG. 18, the system 1700 includes at least four vessels 1710, 1712, 1714, 1716, which are operating in a four-vessel heat cycle, wherein at least three of the four vessels 1710, 1712, 1714, 1716 are always under an operating pressure or vacuum, while one of the four vessels 1710, 1712, 1714, 1716 is being emptied or filled.

In accordance with an exemplary embodiment, as shown in FIG. 18, in step 1810, the first vessel 1710 is filled with a process material such as municipal solid waste and the like, and a wetting agent (e.g., loading & wetting). The door to the vessel 200 is then closed. In step 1812, the eductor system is connected to the filled vessel and entrapped air is evacuated from the vessel (e.g., air evacuation). Since air is a poor conductor, which slows down the heat transfer, and which inhibits the creation of the saturated steam condition required within the body of the first vessel 1710. In step 1814, after the eductor pulls a partial vacuum on the vessel, steam and heat is added to the interior of the vessel to begin the cooling cycle (e.g., introduce steam & heat). In accordance with an exemplary embodiment, the steam is preferably introduced from at least one of the other vessels 1712, 1714, 1716 in a flashing mode and/or a cool down mode, which is transferred through the header system to the first vessel 1710. In accordance with an exemplary embodiment, the heat liquid or steam from each of the vessels 1710, 1712, 1714, 1716 can be released (flashed) one or more times depending on the desired temperature within the vessel 1710, 1712, 1714, 1716. For example, a desired temperature within each of the vessels 1710, 1712, 1714, 1716 may be obtain via one or more flashing of heated liquid or steam at duration of approximately 2 to 3 minutes followed by the addition of the indirect heat source for a duration of approximately 10 minutes. However, each of the processing recipes can be designed for the specific autoclave, type of process material or MSW, and the desired output in the form of biomass and uses associated with the produced biomass. In accordance with an exemplary embodiment, each of the vessels 1710, 1712, 1714, 1716 will perform at least two flashings of heated liquid or steam.

In accordance with an exemplary embodiment, the heated liquid (i.e., steam) is readily absorbed in the first vessel now operating in the condensing mode (or cooking mode). In addition, the helices with their fins on the contact side mix and open up the process material to accept the steam heat and converting it to high temperature water. In step 1816, through the use of a heated liquid or oil, which is conveyed through the interior of the vessel, desired levels for the temperature and pressure within the vessel are achieved, which cooks the process material (e.g., cooking). In accordance with an exemplary embodiment, throughout much of the vessel operation, the vessel is preferably rotated to break down the paper type products and facilitate cleaning of other materials (e.g., glass, metal objects, etc.). In step 1818, the vessel is then vented (i.e., steam is released) to one of other vessels 1712, 1714, 1716), in a flashing mode (or steam explosion) to begin the cooling and depressurization of the vessel while at the same time reducing the moisture content of the material within the vessel (e.g., flash steam). In step 1820, the introduction of the indirect heat from the hot oil source continues, which allows the first vessel to reach its final cooking temperature (e.g., heat). In step 1822, the steam within the first vessel 1710 is released to the third of the four-vessels 1714 to begin the cool down phase (e.g., cool down). In step 1824, once the moisture content and the temperature of the process material in the vessel 200 has been reduced to desired levels, the process material is emptied from the vessel so that the vessel is then ready to begin another treatment cycle (e.g., empty). The cycles for each of the second, third and fourth vessels 1712, 1714, 1716 are shown in FIG. 18, wherein each of the vessels 1712, 1714, 1716 proceeds through the following stages: loading and wetting stage 1830, 1850, 1870, evacuate air 1832, 1852, 1872, introduce steam and heat 1834, 1854, 1874, cook 1836, 1856, 1876, flash steam 1838, 1858, 1878, heat 1840, 1860, 1880, cool down 1842, 1862, 1882, and empty 1844, 1864, 1884.

In accordance with an exemplary embodiment, in order to further optimize the mixing rate, each of the vessel 1710, 1712, 1714, 1716 are preferably placed in an automatic leveling mode, which distributes the tumbling contents or process material uniformly along the barrel of the vessel 200 by load balancing. As shown in FIG. 18, this interaction in a four-vessel heat cycle illustrates the introduction of the third vessel 1714 transferring steam during its flashing mode and it being received by the first vessel 1710. This is also concurrent with the introduction of indirect heat from the hot oil source, which now allows the first vessel to reach its final cooking temperature and continue through the cooking, flashing, cool down and final emptying of the contents. It is important to ensure that when the indirect heat is turned on the air has been fully removed from the autoclave using the eductor and a saturated steam environment exists. This assurance is readily accomplished with the four-vessel system (or four-autoclave), which when carried out eliminates any sticking of the low melt point plastics to the heated surfaces.

In accordance with an exemplary embodiment, to avoid the softening point of lignin present in mechanical pulp waste paper where the final pulp commodity could become excessively brown in color. Accordingly, in accordance with an exemplary embodiment, the cooking temperature within each of the vessels 1710, 1712, 1714, 1716, preferably does not exceed approximately two hundred and seventy degrees Fahrenheit (272° F.), and which is preferably controlled by limiting the maximum temperature during the cooking to approximately 272° F. However, the cooking temperatures and/or other variables within each of the vessels can be varied and/or set within the specified equipment and control mechanisms provided to accommodate variations in the process operation for different process materials and desired output.

As shown in FIG. 18, after the first vessel 1710 has passed through the cool down phase, which includes a drying phase, which is the last phase under pressure, the indirect heat can be cut off and the door removed to begin the emptying process 1824, 1844, 1864, 1884. In accordance with an exemplary embodiment, the four-vessel process flow diagram that the total hot oil supply is kept very near to a constant flow rate, which improves the efficiency of the oil heater operation. Heat energy movement is of even greater import in varying the moisture content than it is in temperature change, which is addressed later particularly in the cooling and drying mode. Moisture movement is carried out using steam as the transport medium and unlike the indirect heat source which remains in liquid form steam relies on the change of state to move large amounts of heat between autoclaves as it changes to high pressure water or in the reverse mode to steam. In accordance with an exemplary embodiment, the indirect heat source provides the vessel with the ability to extend the material drying phase before the door removal. In addition, by extending the drying phase through the use of the indirect heat source, the four-vessel cycles offers the benefit of staying within the closed loop as long as possible and thus continuing to extract moisture through the eductor closed system and controlling emissions. This containment before emptying the autoclave in addition to providing additional drying has dropped the temperature significantly such that when the contents are now in the open environment of the building they are stable having been extensively ventilated. In accordance with an exemplary embodiment, collection bins and conveyors are preferred to be hooded and/or tied in to the building ventilation system for the filtering of any foul smelling odors that may infrequently occur allowing them to be routed through the filtered ventilation system.

In accordance with an exemplary embodiment, the treatment of municipal solid waste (MSW) within a four-vessel plant and the vessels (or autoclaves) are approximately 2 to 20 feet in diameter, more preferably approximately 5 to 15 feet in diameter, and most preferably approximately ten (10) to twelve (12) feet in diameter with a length of approximately 10 to 100 feet in length, more preferably approximately 25 to 75 feet in length, and most preferably approximately 50 to 60 feet in length. However, the length and diameter of the vessels 200 used are preferably selected to provide an average throughput that can be varied to suit specific field conditions. For example, dimensional limitations for the upper size limits that would stay within the desired cycle time coupled with the throughput capacity being sought all limited to the indirect heat transfer that can be accomplished for treatment of municipal solid waste (MSW) having a length of approximately 60 feet with a diameter of approximately 12 feet. The preferred size of the vessel are preferably controlled by the heat exchange medium adopted and can be varied based on the different types and models of surfaces available that can be safely applied. In accordance with an exemplary embodiment, the ratio of the heated surface available versus the volume included in the vessel with the latter varying as the cube of the dimensions whereas the surface areas varied as the square. For example, the mass of the municipal solid waste (MSW) with the added wetting agent dominated as the vessel dimensions increased, however, as described above the surface area available was significantly increased by adding the helice surfaces to the developed tube surface.

In accordance with an exemplary embodiment, the two-hour cycle time can be achieved with a maximum vessel diameter slightly larger than the twelve feet, which uses six helices to augment the available heated surface. In accordance with an exemplary embodiment, the vessel 200 preferably has a length of approximately sixty (60) feet and a diameter of approximately 12 feet (e.g., the length of the vessel is approximately five times the diameter of the vessel) was adopted and further examined related to the total configuration, and the structural adequacy of this tube supported between two sets of flat wheel assemblies. For example, this offers a seventy-five ton batch, which in a four-vessel autoclave system provides a throughput of three thousand tons per day of municipal solid waste (MSW).

The supporting frame point of articulation can be relocated in order to reduce the loading height for the autoclave door with the wetting chamber and conveyor but still permitting a movement of the nose cone of the vessel 200 to approximately 45 degrees. For example, existing buildings can be remodeled to accommodate the inclusion of autoclaves and roof clearances are not sufficient without major changes. At the same time, the nose cone of the vessel 200 drops to approximately 25 degrees in the other direction, which improves unloading but more importantly creates the large cavity in the tail of the autoclave, which facilitates the steam removal during cool down. In accordance with an exemplary, the loading angle gives aid to the helices by the reduction in the sliding friction to the waste as it is compacted into the body of the autoclave allowing the maximum weight of the contents to be included before the door is fastened. Furthermore, the ability to vary the rotational speed along with the filling rate provides operational flexibility in the sequence programming, which optimizes the autoclave treatment process.

As set forth above, in collecting municipal solid waste, cities and municipalities often use packer trucks for the purpose of maximizing the load capacity of the truck during collection of the process material (e.g., municipal solid waste). In addition, similar packing devices are used to densify the municipal solid waste when railroad containers (or rail-haul) are used for transportation of the waste (e.g., residuals) to remote landfills. In accordance with an exemplary embodiment, the system 1700 as described herein is designed to accommodate the need of municipalities to compact the material when introduced through the wetting chamber into the mouth of the vessel commingled with the liquid wetting agent (i.e., waste activated sludge), which can be a low quality-water.

For example, at the filling stage of each of the vessels 1710, 1712, 1714, 1716, the vessels are inclined at forty-five degrees and rotating such that the helices running the full length of the tube are compressing the contents (e.g., process material), which are further aided by the shear spline located in the base of the vessel. This shear spline does not rotate with the vessel but minimizes the probability that the municipal solid waste (MSW) mass lodges in the tail end of the vessel and be deprived of the mixing action essential to the process.

FIG. 19 is a chart showing the mode of operation of a four-vessel system 1900 illustrated in FIGS. 17 and 18. As shown in FIG. 19, the four-vessel system 1900 includes four vessels 1710, 1712, 1714, 1716, which are operating on a general two-hour cycle. Each of the vessels 1710, 1712, 1714, 1716 goes through a series of phases, which includes the filling of the vessel with a process material and a wetting agent in step 1910. In step 1912, the door of the vessel is closed and air within the vessel is removed from the vessel. In step 1914, the moisture content of the waste material is then further increased through the introduction of steam, which also increases the temperature within the vessel as well as the temperature of the waste material itself. Through the use of a heated liquid, which is conveyed through the interior of the vessel, desired levels for the temperature and pressure within the vessel are achieved. Throughout much of the vessel operation, the vessel is preferably rotated to break down the paper type products and facilitate cleaning of other materials (e.g., glass, metal objects, etc.). In step 1916, the vessel is then vented (flash mode) to one of the other vessels to begin the cooling and depressurization of the vessel while at the same time reducing the moisture content of the material within the vessel. The venting of the vessel increases the temperature and moisture content within the receiving vessel. In step 1918, the heated liquid, which continues to be conveyed through the vessel, is then used to dry the material to a desired degree. Once the moisture content and the temperature of the material in the vessel has been reduced to desired levels, in step 1920, the remaining steam is vented to another vessel within the system, which adds heat and moisture into the corresponding vessel. In step 1922, the processed material is emptied from the vessel so that the vessel is then ready to begin another treatment cycle.

In accordance with an exemplary embodiment, as shown in FIG. 19, the filling and loading of each of the vessels is preferably performed at between approximately 62° F. to approximately 92° F., and the cooking of the process material is performed from approximately 262° F. to approximately 292° F. depending on the process material and the desired output. For example, for pulping of paper products, the temperature within the vessel preferably does not exceed 272° F. (e.g., melt point of lignin within the pulp and/or paper). During the processing of the process material, the vessel is rotated about its longitudinal axis such that during the condensing mode the helice rotation allows the fins to break up the process material and accelerate the condensing as well as the dissolving of the tumbling mass fraction of carbohydrate materials.

Flashing and Cool Down Phases for a Four-Vessel Unit

Vessel 1: flash to Vessel 2; flash from Vessel 4; cool down to Vessel 3; and cool down from Vessel 3.

Vessel 2: flash to Vessel 3; flash from Vessel 1; cool down to Vessel 4; and cool down from Vessel 4.

Vessel 3: flash to Vessel 4; flash from Vessel 2; cool down to Vessel 1; and cool down from Vessel 1.

Vessel 4: flash to Vessel 1; flash from Vessel 3; cool down to Vessel 2; and cool down from Vessel 2.

As can be appreciated from the foregoing description, the apparatus, system and method according to the present invention are quite advantageous as they allow a wide range of material to be treated. By simply changing the operational parameters, the apparatus, system and method can be specifically tailored to achieve particularized desired results for different types of materials, thereby facilitating separation and sorting efforts.

The present invention is also highly desirable, as it does not require high quality water for treatment of the material. As set forth above, it is possible to employ water of low-grade quality, which, through operation of the apparatus and system, is actually increased in quality. In that way, wastewater, such as waste activated sludge (WAS) can be used as the water source and subsequently converted to water whose quality is useful for other purposes.

Energy and water conservation represent another advantage of the present invention. By maintaining the system so that heat and steam generated in one of the vessels are subsequently used to heat and raise the moisture content of the process material in another vessel, the water and energy requirements for the system can be significantly reduced. Although the system requires the addition of steam from an external source (e.g., a steam generating device can be connected to the steam supply header), the amount is significantly less than would otherwise be the case. In addition, the present invention also allows the material to be dried to the extent desired before it is emptied from the vessel. Thus, subsequent separation and sorting efforts can be made easier.

The principles, preferred embodiments and modes of operation of the present invention have been described in the foregoing specification. However, the invention, which is intended to be protected, is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents, which fall within the spirit and scope of the present invention as defined in the claims be embraced thereby.

What is claimed is:

1. A method for treating process material using a plurality of autoclaves, each of the plurality of autoclaves comprising a hollow vessel having a longitudinal axis and an interior for receiving process material to be treated, wherein each of the plurality of autoclaves cycles through the following:
   introducing steam from one or more of the plurality of autoclaves into an interior of a vessel, the interior of the vessel being another of the one or more of the plurality of autoclaves;
   increasing the temperature within the interior of the vessel by adding heat to the interior of the vessel using an indirect heat source;
   reducing the temperature and pressure within the interior of the vessel by flashing a portion of the steam within the interior of the vessel to another one of the plurality of autoclaves while maintaining the temperature within the interior of the vessel within a range of a cooking temperature of the process material;
   increasing the temperature within the interior of the vessel by continuing to add heat to the interior of the vessel using the indirect heat source after the flashing of the portion of the steam from the interior of the vessel;
   reducing a moisture content of the process material in the interior of the vessel to a predetermined value with the heat from the indirect heat source; and
   venting a remaining portion of the steam from the interior of the vessel to another one of the plurality of autoclaves.

2. The method of claim 1, further comprising:
   introducing a process material into the interior of the vessel; and
   filling the interior of the vessel to 50% to 70% by volume.

3. The method of claim 2, further comprising:
   removing the process material in the interior of the vessel after the moisture content of the process material has reached the predetermined value.

4. The method of claim 1, further comprising:
   rotating the interior of the vessel about its longitudinal axis in order to assist in breaking down the process material.

5. The method of claim 1, wherein the indirect heat source is a hot oil.

6. The method of claim 1, further comprising:
   increasing a moisture content of the process material by adding a wetting agent to the process material as the process material is introduced into the interior of the vessel.

7. The method of claim 6, wherein the process material is municipal solid waste and the wetting agent is from a waste activated sludge or a low quality water source.

8. The method of claim 7, wherein the process recovers cellulose as a commodity, and the temperature within the interior of the vessel is increased to no greater than 272° F.

9. The method of claim 1, wherein the interior of the vessel is adapted to be inclined at an angle of inclination relative to a horizontal position, and including detecting when the process material within the interior of the vessel is substantially non-uniformly distributed along the interior of the vessel and adjusting the angle of inclination of the interior of the vessel when detecting that the process material is substantially non-uniformly distributed in order to cause the process material to be redistributed within the interior of the vessel so as to be substantially uniformly distributed.

10. The method of claim 1, wherein the interior of the vessel includes a centrally positioned cantilevered shaft that extends into the interior of the vessel, the shaft have a plurality of fins extending therefrom, and wherein the interior of the vessel is rotated while said shaft remains stationary in order to effect a shearing action on the process material.

11. The method of claim 1, further comprising:
   conveying the indirect heat source through a helically disposed fluid transport conduit.

12. The method of claim 11, wherein the helically disposed fluid transport conduit makes a 180-degree helical revolution between opposite ends of the interior of the vessel.

13. The method of claim 12, wherein the helically disposed fluid transport conduit comprises one or more helices, each of the one or more helices having a one side with a smooth face, which transfers heat from the indirect heat source on the smooth face by a wiping action, and on the other side the helices are fitted with one or more projecting fins for breaking up the process material.

14. The method of claim 1, wherein the plurality of autoclaves is a four-vessel system, which process a batch of process material in each of the plurality of autoclaves on a two-hour cycle.

15. A system for treating a process material, the system comprising:
   a plurality of autoclaves, each of the plurality of autoclaves comprising a hollow vessel having a longitudinal axis and an interior for receiving process material to be treated, each of the plurality to autoclaves having an opening configured to receive process material;
   a controller configured to control a plurality of regulating valves and corresponding temperatures of each of the of vessels, the plurality of regulating valves configured to direct a flow of steam and indirect heat sources within the system; and wherein each of the plurality of autoclaves is configured to:
receive a process material into an interior of a vessel, wherein the interior of the vessel is filled to 50% to 70% by volume;
introduce a steam from one or more of the plurality of autoclaves into the interior of the vessel, the interior of the vessel being another of the one or more of the plurality of autoclaves;
increase the temperature within the interior of the vessel by adding heat to the interior of the vessel using an indirect heat source;
reduce the temperature and pressure within the interior of the vessel by flashing a portion of the steam within the interior of the vessel to another one of the plurality of autoclaves while maintaining the temperature within the interior of the vessel within a range of a cooking temperature of the process material, the range of the cooking temperature of the process material being 262° F. to 292° F.;
increase the temperature within the interior of the vessel by continuing to add heat to the interior of the vessel using the indirect heat source after the flashing of the portion of the steam from the interior of the vessel;
reduce a moisture content of the process material in the interior of the vessel to a predetermined value with the heat from the indirect heat source;
vent a remaining portion of the steam to another one of the plurality of autoclaves; and
remove the process material from the interior of the vessel after the moisture content of the process material has reached the predetermined value.

16. The system of claim 15, further comprising:
a drive means for rotating the interior of the vessel in opposite directions about the longitudinal axis to assist in breaking down the process material.

17. The system of claim 16, wherein the drive means is an arcuate and pinion arrangement.

18. The system of claim 15, wherein the process recovers cellulose as a commodity, and wherein the temperature within the interior of the vessel is increased to no greater than 272° F.

19. The system of claim 15, wherein the process material is municipal solid waste (MSW).

20. The system of claim 15, wherein a wetting agent is added to the process material to increase the moisture content of the process material as the process material is introduced into the interior of the vessel.

21. The system of claim 20, wherein the wetting agent is generated from a source of waste activated sludge (WAS) or a low quality water source.

22. The system of claim 15, wherein the interior of the vessel has one or more helices, which are arranged with one side having a smooth face, which transfers heat from the indirect heat source on the smooth face by a wiping action, and on the other side the helices are fitted with one or more projecting fins for breaking up the process material.

23. The system of claim 15, further comprising:
a rotary coupling, which introduces a steam into the interior of the vessel.

24. The system of claim 23, wherein the rotary coupling includes a cantilevered shaft positioned centrally within the interior of the vessel, said cantilevered shaft having at least one fin extending therefrom for contacting and mixing process material in the interior of the vessel, and wherein rotating the interior of the vessel relative to the cantilevered shaft imparts a shearing force to process material within the interior of the vessel, and wherein the cantilevered shaft is fixed with respect to the interior of the vessel so that the shaft remains stationary during rotation of the interior of the vessel about its longitudinal axis.

25. The system of claim 15, wherein the interior of the vessel is adapted to be inclined at an angle of inclination relative to a horizontal position, and including detecting when the process material within the interior of the vessel is substantially non-uniformly distributed along the interior of the vessel and adjusting the angle of inclination of the interior of the vessel when detecting that the process material is substantially non-uniformly distributed in order to cause the process material to be redistributed within the interior of the vessel so as to be substantially uniformly distributed.

26. The system of claim 15, wherein the plurality of autoclaves is a four-vessel system, which process a batch of the process material in each of the plurality of autoclaves on a two-hour cycle.

27. The system of claim 15, comprising:
a door assembly having a double locking ring system, which includes a main annular locking ring, which secures a door to a front cone portion of the interior of the vessel, and a locator annular locking ring, which provides a means for removing and attaching the door to the front cone portion of the interior of the vessel.

28. The system of claim 27, further comprising:
a pair of horizontal servomotor piston arrangements and a pair of diagonal servomotor piston arrangements, which controls opening and closing of the door assembly.

29. The system of claim 15, further comprising:
one or more heat exchange panels on an interior surface of each of the autoclaves.

30. The system of claim 15, further comprising:
one or more heat exchange panels on an exterior surface of each of the autoclaves.

* * * * *